(12) United States Patent
Nakano et al.

(10) Patent No.: US 12,448,697 B2
(45) Date of Patent: Oct. 21, 2025

(54) SURFACE-TREATED STEEL SHEET AND PRODUCTION METHOD THEREFOR

(71) Applicant: TOYO KOHAN CO., LTD., Tokyo (JP)

(72) Inventors: Yuji Nakano, Kudamatsu (JP); Koh Yoshioka, Kudamatsu (JP); Kazuhiko Ishihara, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 17/606,603

(22) PCT Filed: Apr. 27, 2020

(86) PCT No.: PCT/JP2020/017988
§ 371 (c)(1),
(2) Date: Oct. 26, 2021

(87) PCT Pub. No.: WO2020/222305
PCT Pub. Date: Nov. 5, 2020

(65) Prior Publication Data
US 2022/0235482 A1    Jul. 28, 2022

(30) Foreign Application Priority Data

Apr. 27, 2019  (JP) .................... 2019-086917

(51) Int. Cl.
*C25D 5/12* (2006.01)
*C25D 5/50* (2006.01)
(Continued)

(52) U.S. Cl.
CPC ............ *C25D 5/12* (2013.01); *C25D 5/50* (2013.01); *C25D 7/0614* (2013.01); *H01M 50/116* (2021.01); *H01M 50/107* (2021.01)

(58) Field of Classification Search
CPC .......... C25D 5/50; C25D 5/12; C25D 7/0614; B32B 15/013; H01M 50/116; H01M 50/107
See application file for complete search history.

(56) References Cited

U.S. PATENT DOCUMENTS

| 4,853,295 A | 8/1989 | Shindo et al. |
| 6,087,040 A | 7/2000 | Ohmura et al. |

(Continued)

FOREIGN PATENT DOCUMENTS

| CN | 1311829 A | 9/2001 |
| CN | 1449588 A | 10/2003 |

(Continued)

OTHER PUBLICATIONS

Machine translation of WO-2018052009-A1 (Year: 2024).*

(Continued)

*Primary Examiner* — Milton I Cano
*Assistant Examiner* — Albert Michael Hilton
(74) *Attorney, Agent, or Firm* — Sughrue Mion, PLLC

(57) ABSTRACT

A surface-treated steel sheet including: a steel sheet; and a nickel-cobalt-iron diffusion layer formed on the steel sheet as an outermost layer. When the intensities for Ni, Co and Fe are consecutively measured from a surface of the nickel-cobalt-iron diffusion layer in the depth direction by radio frequency glow discharge optical emission spectrometry, and the concentration of Ni, Co and Fe at each of depth positions are determined based on the intensities for Ni, Co, and Fe, a Co concentration gradient $\Delta P_{Co}$ ranging from a depth position $D_{Co\_MAX}$ to a depth position $D_{Co\_15\%}$ is 33% by mass/0.1 μm or less. A depth position at which the concentration of Co is maximum is defined as $D_{Co\_MAX}$ and a depth position located closer to the steel sheet than the (Continued)

depth position $D_{Co\_MAX}$ and at which the concentration of Co is 15% of the maximum value is defined as $D_{Co\_15\%}$.

16 Claims, 8 Drawing Sheets

(51) Int. Cl.
  *C25D 7/06* (2006.01)
  *H01M 50/116* (2021.01)
  *H01M 50/107* (2021.01)

(56) References Cited

U.S. PATENT DOCUMENTS

| | | | |
|---|---|---|---|
| 6,692,869 | B1 | 2/2004 | Ohmura et al. |
| 2004/0005476 | A1 | 1/2004 | Ando et al. |
| 2004/0005499 | A1 | 1/2004 | Ohmura et al. |
| 2005/0112459 | A1 | 5/2005 | Ohmura et al. |
| 2014/0050971 | A1 | 2/2014 | Tomomori et al. |
| 2014/0147734 | A1 | 5/2014 | Horie et al. |
| 2014/0193665 | A1 | 7/2014 | Kawata et al. |
| 2018/0347061 | A1 | 12/2018 | Sadaki et al. |
| 2018/0351138 | A1 | 12/2018 | Asada et al. |
| 2018/0366691 | A1 | 12/2018 | Sadaki et al. |
| 2020/0035960 | A1* | 1/2020 | Nakano .......... C23C 10/00 |
| 2020/0321566 | A1 | 10/2020 | Nakano et al. |
| 2021/0028415 | A1 | 1/2021 | Sadaki et al. |
| 2021/0151824 | A1 | 5/2021 | Sadaki et al. |
| 2022/0166092 | A1 | 5/2022 | Asada et al. |

FOREIGN PATENT DOCUMENTS

| | | | | |
|---|---|---|---|---|
| CN | 102230200 | A | 11/2011 | |
| CN | 103594626 | A | 2/2014 | |
| CN | 103597626 | A | 2/2014 | |
| CN | 103732781 | A | 4/2014 | |
| CN | 108368628 | A | 8/2018 | |
| JP | 02-118087 | A | 5/1990 | |
| JP | 08-120431 | A | 5/1996 | |
| JP | 2004-143567 | A | 5/2004 | |
| JP | 2005-290395 | A | 10/2005 | |
| JP | 2007-122940 | A | 5/2007 | |
| JP | 2010-159477 | A | 7/2010 | |
| JP | 2016-186950 | A | 10/2016 | |
| WO | 2012/147843 | A1 | 11/2012 | |
| WO | 2014/007002 | A1 | 1/2014 | |
| WO | WO-2018052009 | A1 * | 3/2018 | ......... C25D 5/14 |
| WO | WO-2018181950 | A1 * | 10/2018 | ......... C23C 10/00 |
| WO | 2019/083044 | A1 | 5/2019 | |

OTHER PUBLICATIONS

Koh Yoshioka et al., "Development of the Nickel-Cobalt Alloy Plating Material for Alkaline Manganese Battery Cathode Case", Toto Kohan, Toyo Kohan Co., Ltd. Technical Research Laboratory, Mar. 2017, 11 pgs., vol. 39.

International Search Report for PCT/JP2020/017988 dated, Jul. 7, 2020 (PCT/ISA/210).

Office Action dated Feb. 2, 2023 from the China National Intellectual Property Administration in CN Application No. 202080031462.3.

Search Report dated Mar. 13, 2023 from the Intellectual Property Office of Singapore in SI Application No. 11202111895S.

Office Action mailed Oct. 24, 2023 in corresponding Chinese Application No. 202080031462.3.

Office Action dated May 15, 2023 from the Indonesian Patent Office in Application No. P00202109189.

Office Action (Notice of Reasons for Refusal) issued Jul. 2, 2024 in Japanese Application No. 2021-517163.

Communication issued Mar. 17, 2025 in Korean Application No. 10-2021-7037172.

Communication issued Apr. 29, 2025 in Indonesian Application No. P00202109189.

Indonesian Official Action dated Nov. 11, 2024 in Application No. P00202109189.

Written Opinion of the International Property Office of Singapore Dated Aug. 21, 2024 in the Singapore Application No. 11202111895S.

* cited by examiner

SURFACE-TREATED STEEL SHEET AND PRODUCTION METHOD THEREFOR

CROSS REFERENCE TO RELATED APPLICATIONS

This application is a National Stage of International Application No. PCT/JP2020/017988 filed Apr. 27, 2020, claiming priority based on Japanese Patent Application No. 2019-086917 filed Apr. 27, 2019.

TECHNICAL FIELD

The present invention relates to a surface-treated steel sheet and a production method therefor.

BACKGROUND ART

In recent years, portable devices, such as audio devices and cell phones, have been used in many fields, and as their operating power sources, alkaline batteries, which are primary batteries, and nickel hydrogen batteries, lithium ion batteries and the like, which are secondary batteries, are widely used. These batteries are required to have improved performance including an increased output and a prolonged life, and as an important constitutional element thereof, the battery cases for packing power generating elements including a positive electrode active substance, a negative electrode active substance and the like are also required to have improved performance.

For example, Patent Document 1 discloses a battery case having a specific nickel-cobalt alloy layer formed as the outermost surface which is to be the inner surface of a battery case when used in view of improving the battery characteristics.

RELATED ART

Patent Document

Patent Document 1: International Publication No. WO 2012/147843

SUMMARY OF THE INVENTION

Problem to be Solved by the Invention

However, if the battery case disclosed in Patent Document 1 is used as a battery case of a battery containing a strongly alkaline electrolyte solution, such as an alkaline battery, a nickel hydrogen battery or the like, the contact resistance value of the inner surface of the battery case in contact with the electrolyte solution undesirably rises along with a lapse of time to impair the battery characteristics. With regard to this problem, further improvements of battery characteristics have been demanded, including suppression of impairing the battery characteristics after a lapse of time.

An object of the present invention is to provide a surface-treated steel sheet which ensures excellent battery characteristics when used in a battery case for a battery containing a strongly alkaline electrolyte solution, and can suppress a reduction in battery characteristics even after a lapse of time. Another object of the present invention is to provide a method for producing such a surface-treated steel sheet.

Means for Solving the Problem

The present inventors, who have conducted extensive research to achieve the above objects, have found that these objects can be achieved by a surface-treated steel sheet including a nickel-cobalt-iron diffusion layer formed on a steel sheet as an outermost surface layer thereof, wherein the Co concentration gradient $\Delta P_{Co}$ as a Co concentration change rate is controlled to fall within a specific range, the concentration of Co in the nickel-cobalt-iron diffusion layer being determined by performing measurement by radio frequency glow discharge optical emission spectrometry on the surface-treated steel sheet, and have completed the present invention.

Namely, the present invention provides a surface-treated steel sheet comprising: a steel sheet; and a nickel-cobalt-iron diffusion layer formed on the steel sheet as an outermost layer, wherein when the intensities for Ni, Co, and Fe are consecutively measured from a surface of the nickel-cobalt-iron diffusion layer in the depth direction by radio frequency glow discharge optical emission spectrometry, and the concentration of Ni, the concentration of Co, and the concentration of Fe at each of depth positions of the nickel-cobalt-iron diffusion layer are determined based on the intensities for Ni, Co, and Fe, a Co concentration gradient $\Delta P_{Co}$ ranging from a depth position $D_{Co\_MAX}$ to a depth position $D_{Co\_15\%}$ is 33% by mass/0.1 μm or less, where a depth position at which the concentration of Co is maximum is defined as $D_{Co\_MAX}$ and a depth position which is located closer to the steel sheet than the depth position $D_{Co\_MAX}$ and at which the concentration of Co is 15% of the maximum value is defined as $D_{Co\_15\%}$.

In the surface-treated steel sheet according to the present invention, when the intensities for Ni, Co, and Fe are consecutively measured from the surface of the nickel-cobalt-iron diffusion layer in the depth direction by radio frequency glow discharge optical emission spectrometry, and the concentration of Ni, the concentration of Co, and the concentration of Fe at each of depth positions of the nickel-cobalt-iron diffusion layer are determined based on the intensities for Ni, Co, and Fe, a Ni concentration gradient $\Delta P_{Ni}$ ranging from a depth position $D_{Ni\_MAX}$ to a depth position $D_{Ni\_15\%}$ is preferably 15% by mass/μm or more, where a depth position at which the concentration of Ni is maximum is defined as $D_{Ni\_MAX}$, and a depth position which is located closer to the steel sheet than the depth position $D_{Ni\_MAX}$ and at which the concentration of Ni is 15% of the maximum value is defined as $D_{Ni\_15\%}$.

In the surface-treated steel sheet according to the present invention, when the intensities for Ni, Co, and Fe are consecutively measured from the surface of the nickel-cobalt-iron diffusion layer in the depth direction by radio frequency glow discharge optical emission spectrometry, and the concentration of Ni, the concentration of Co, and the concentration of Fe at each of depth positions of the nickel-cobalt-iron diffusion layer are determined based on the intensities for Ni, Co, and Fe, preferably, the Ni concentration $P_{Ni}(D_{Ni\_0.5\%})$ at a depth position $D_{Ni\_0.5\%}$ is 70% by mass or less, the Co concentration $P_{Co}(D_{Ni\_0.5\%})$ at the depth position $D_{Ni\_0.5\%}$ is 5% by mass or more, and the Fe concentration $P_{Fe}(D_{Ni\_0.5\%})$ at the depth position $D_{Ni\_0.5\%}$ is 15% by mass or more, where among depth positions at which the intensity for Ni in the nickel-cobalt-iron diffusion layer is 0.5% of the maximum value, the depth position located closest to the surface is defined as $D_{Ni\_0.5\%}$%.

In the surface-treated steel sheet according to the present invention, the Fe concentration $P_{Fe}(D_{Ni\_0.5\%})$ at the depth position $D_{Ni\_0.5\%}$ is preferably 30% by mass or more.

In the surface-treated steel sheet according to the present invention, the Co concentration $P_{Co}(D_{Ni\_0.5\%})$ at the depth position $D_{Ni\_0.5\%}$ is preferably 12% by mass or more.

In the surface-treated steel sheet according to the present invention, the Co content in the nickel-cobalt-iron diffusion layer is preferably 0.2 g/m² or more.

In the surface-treated steel sheet according to the present invention, the Ni content in the nickel-cobalt-iron diffusion layer is preferably 0.2 to 12.5 g/m².

In the surface-treated steel sheet according to the present invention, the Ni content in the nickel-cobalt-iron diffusion layer is preferably 0.2 to 7.0 g/m².

In the surface-treated steel sheet according to the present invention, the total content of Ni and Co contained in the nickel-cobalt-iron diffusion layer is preferably 1.6 to 14.0 g/m².

In the surface-treated steel sheet according to the present invention, the total content of Ni and Co contained in the nickel-cobalt-iron diffusion layer is preferably 1.6 to 7.5 g/m².

Preferably, the surface-treated steel sheet according to the present invention further comprises an iron-nickel diffusion layer between the steel sheet and the nickel-cobalt-iron diffusion layer.

In the surface-treated steel sheet according to the present invention, the total content of Ni contained in the nickel-cobalt-iron diffusion layer and the iron-nickel diffusion layer is preferably 1.0 to 12.5 g/m².

In the surface-treated steel sheet according to the present invention, the total content of Ni and Co contained in the nickel-cobalt-iron diffusion layer and the iron-nickel diffusion layer is preferably 1.6 to 14.0 g/m².

Moreover, the present invention provides a battery case comprising any one of the surface-treated steel sheets above.

The present invention provides a battery including the battery case.

Furthermore, the present invention provides a method for producing a surface-treated steel sheet, comprising the steps of: forming a nickel plating layer containing 0.2 to 12.5 g/m² of nickel on a steel sheet; forming a cobalt plating layer containing 0.2 to 5.0 g/m² of cobalt on the nickel plating layer; and performing a heat treatment at a temperature of 450 to 900° C. on the steel sheet having the nickel plating layer and the cobalt plating layer to form a nickel-cobalt-iron diffusion layer as an outermost layer thereof, the nickel-cobalt-iron diffusion layer having a Co concentration gradient $\Delta P_{Co}$ of 33% by mass/0.1 µm or less.

Effects of Invention

The present invention can provide a surface-treated steel sheet which ensures excellent battery characteristics when used in a battery case for a battery containing a strongly alkaline electrolyte solution, and can suppress a reduction in battery characteristics even after a lapse of time. The present invention can also provide a method for producing such a surface-treated steel sheet.

DESCRIPTION OF EMBODIMENTS

One embodiment according to the present invention will now be described with reference to the drawings. The surface-treated steel sheet according to the present invention is processed into an outer shape according to a desired battery shape. Examples of the battery include, but should not be limited to, alkali batteries as primary batteries, and nickel hydrogen batteries and lithium ion batteries as secondary batteries, and the like. These batteries can include the surface-treated steel sheet according to the present invention as a member of the battery case. Hereinafter, using an alkali battery as one example of the battery containing a strongly alkaline electrolyte solution, an embodiment according to the present invention will be described, in which the surface-treated steel sheet according to the present invention is included in a positive electrode can which configures a battery case for the alkali battery.

Figure 1:
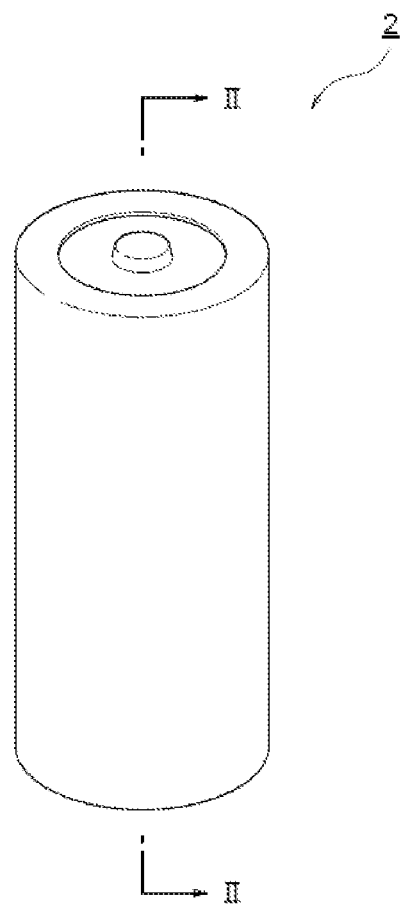
FIG. 1 is a perspective view showing one embodiment of a battery including the surface-treated steel sheet according to the present invention.
Figure 2:
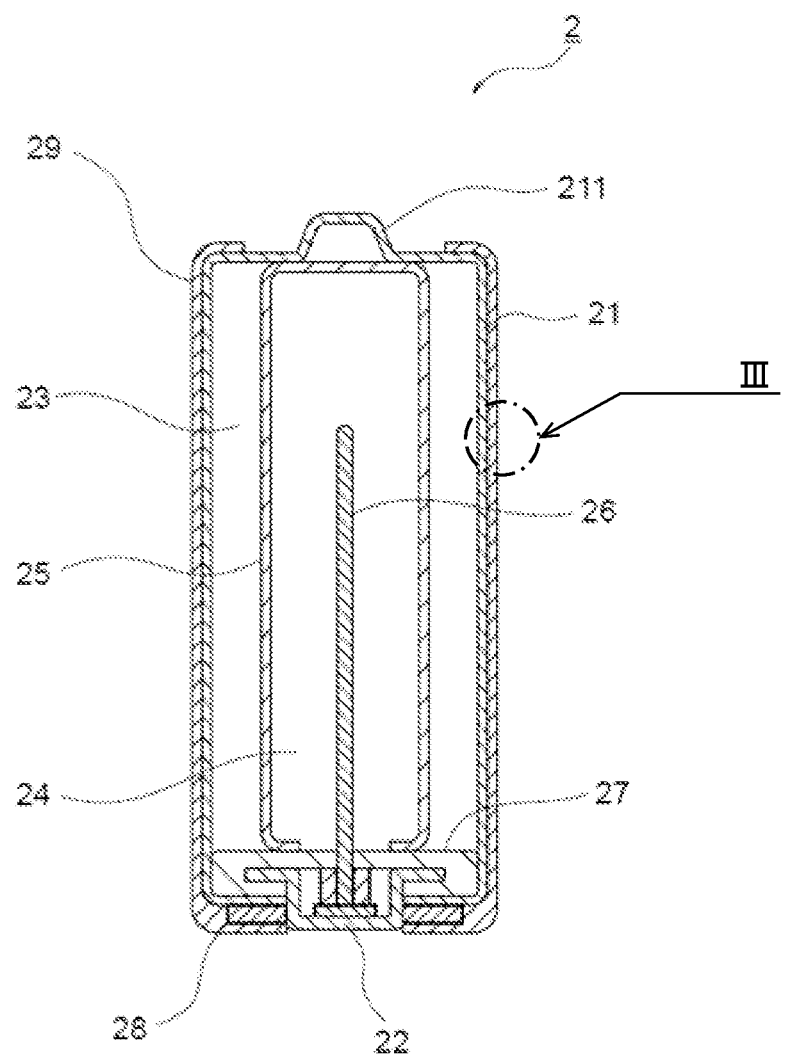
FIG. 2 is a cross-sectional view taken along the line II-II in FIG. 1.

FIG. 1 is a perspective view showing one embodiment of an alkali battery 2 including the surface-treated steel sheet according to the present invention, and FIG. 2 is a cross-sectional view taken along the line II-II in FIG. 1. In this example, the alkali battery 2 includes a bottomed cylindrical positive electrode can 21, and a positive electrode mixture 23 and a negative electrode mixture 24 filled into the can 21 with a separator 25 interposed therebetween. The alkali battery 2 also includes a sealing body caulked to the inner surface of the opening of the positive electrode can 21, the sealing body including a negative electrode terminal 22, a current collector 26, and a gasket 27. A projected positive electrode terminal 211 is formed in the center of the bottom of the positive electrode can 21. To impart insulation and improve designability, an outer package 29 is fitted onto the positive electrode can 21 via an insulating ring 28.

The positive electrode can 21 of the alkaline battery 2 illustrated in FIG. 1 can be obtained by forming the surface-treated steel sheet according to the present invention by a deep drawing process, a drawing and ironing process (DI work process), a drawing and thin-redrawing process (DTR work process), a combined work process of stretching work and ironing work after drawing work, or the like. Hereinafter, the configuration of the surface-treated steel sheet according to the present invention (surface-treated steel sheet 1) will be described with reference to FIG. 3.

Figure 3:
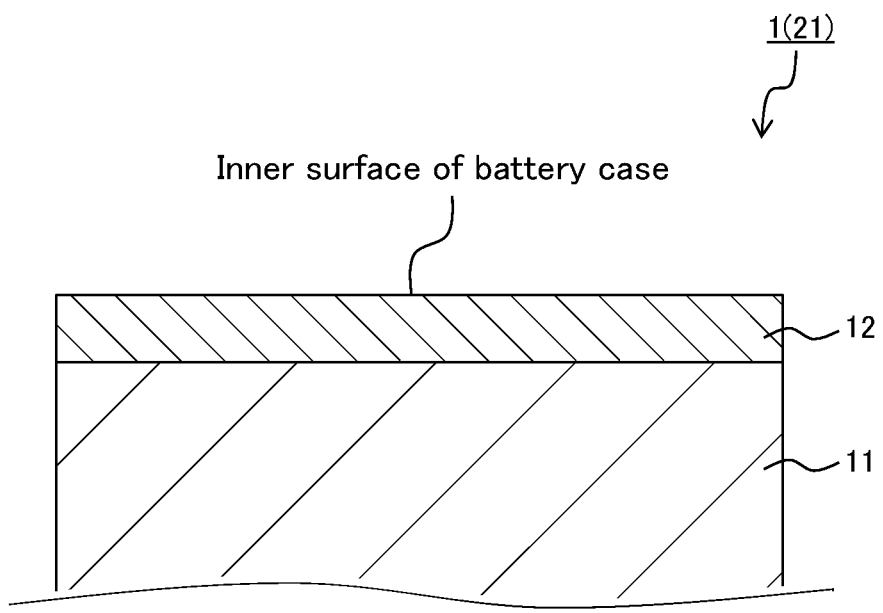
FIG. 3 is an enlarged cross-sectional view of a portion III in FIG. 2 in one embodiment of the surface-treated steel sheet according to the present invention.

FIG. 3 is an enlarged cross-sectional view of a portion III of the positive electrode can 21 shown in FIG. 2. In the drawing, the upper side corresponds to the inner surface of the alkali battery 2 in FIG. 1 (the surface in contact with the positive electrode mixture 23 of the alkali battery 2). As shown in FIG. 3, the surface-treated steel sheet 1 according to the present embodiment includes a nickel-cobalt-iron diffusion layer 12 formed on a steel sheet 11 which constitutes the surface-treated steel sheet 1. The surface-treated steel sheet 1 according to the present embodiment may include the nickel-cobalt-iron diffusion layer 12 on at least one of surfaces of the steel sheet 11, specifically, the surface corresponding to the inner surface of the alkali battery 2 (the surface corresponding to the inner surface of the battery case). Although the nickel-cobalt-iron diffusion layer may also be formed on the surface corresponding to the outer surface (the surface corresponding to the outer surface of the battery case), that is, on both of the surfaces, preferably, the surface corresponding to the outer surface is foiled by forming a nickel-iron diffusion layer and a nickel layer in sequence from the steel sheet side from the viewpoint of rust resistance during storage or use as a battery.

The surface-treated steel sheet 1 according to the present embodiment is a surface-treated steel sheet including the nickel-cobalt-iron diffusion layer 12 as an outermost surface formed on the steel sheet 11, wherein when the intensities for Ni, Co, and Fe in the surface-treated steel sheet 1 are consecutively measured from the surface of the nickel-cobalt-iron diffusion layer 12 in the depth direction by radio frequency glow discharge optical emission spectrometry, and the concentration of Ni, the concentration of Co, and the concentration of Fe at each of depth positions of the nickel-cobalt-iron diffusion layer 12 are determined based on the intensities for Ni, Co, and Fe, the Co concentration gradient $\Delta P_{Co}$ ranging from the depth position $D_{Co\_MAX}$ to the depth position $D_{Co\_15\%}$ is 33% by mass/0.1 μm or less, where the depth position at which the concentration of Co is maximum is defined as $D_{Co\_MAX}$ and the depth position which is located closer to the steel sheet 11 than the depth position $D_{Co\_MAX}$ and at which the concentration of Co is 15% of the maximum value is defined as $D_{Co\_15\%}$.

<Steel Sheet 11>

The steel sheet 11 according to the present embodiment may be any steel sheet having high workability, and is not particularly limited. For example, low carbon aluminum-killed steels (carbon content: 0.01 to 0.15% by weight), extra-low carbon steels having a carbon content of lower than 0.01% by weight, or non-aging extra-low carbon steels made by adding Ti, Nb, or the like to an extra-low carbon steel can be used. In the present embodiment, steel sheets obtained by hot rolling any of these steels, acid pickling the hot rolled steel to remove scales (oxide film) on the surface, cold rolling the pickled steel, electrolytically cleaning the cold rolled steel, and annealing and temper rolling the resultant steel; or steel sheets obtained by temper rolling the pickled steel after cold rolling and electrolytically cleaning without annealing can also be used. From the viewpoint of productivity, use of a continuous steel strip as the steel sheet 11 is preferred.

The thickness of the steel sheet 11 may suitably be selected according to applications of the surface-treated steel sheet, and is not particularly limited. The thickness is preferably 0.015 to 1.5 mm. The thickness is preferably 0.15 to 0.6 mm for a steel sheet (carbon steel or stainless steel) for a battery such as an alkali battery or a coin battery, and is preferably 0.15 to 0.5 mm for a steel sheet for the alkali battery can in particular. On the other hand, in applications requiring weight reduction and flexibility, the steel sheet 11 preferably has a foil shape with the thickness of 0.015 mm to 0.1 mm.

<Nickel-Cobalt-Iron Diffusion Layer 12>

Figure 4:
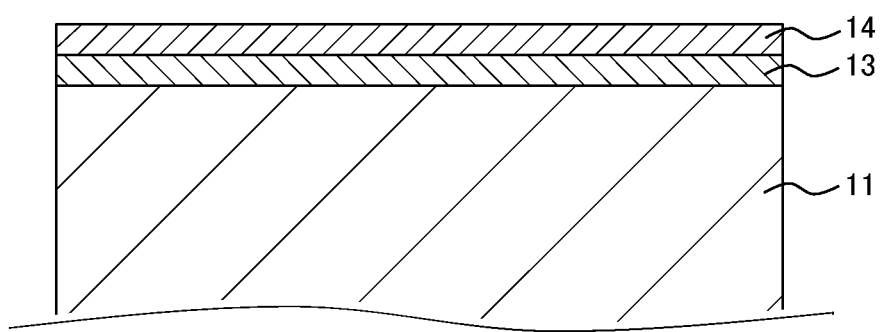
FIG. 4 is a diagram for illustrating a method for producing the surface-treated steel sheet shown in FIG. 3.

The surface-treated steel sheet 1 according to the present embodiment includes the nickel-cobalt-iron diffusion layer 12 on the steel sheet 11. In the present embodiment, examples of a usable method of forming the nickel-cobalt-iron diffusion layer 12 include a method of forming the nickel-cobalt-iron diffusion layer 12 by forming a nickel plating layer 13 and a cobalt layer 14 in sequence on the surface of the steel sheet 11 as shown in FIG. 4, and then performing a heat treatment to diffuse iron, nickel, and cobalt contained in the steel sheet and these layers. The method of forming the nickel-cobalt-iron diffusion layer 12 is not particularly limited to such a method.

In the nickel-cobalt-iron diffusion layer 12 of the surface-treated steel sheet 1 according to the present embodiment, the Co concentration change rate, i.e., the Co concentration gradient $\Delta P_{Co}$ in a specific depth region thereof is controlled within a specific range.

In other words, in the surface-treated steel sheet 1, when the intensities for Ni, Co, and Fe are consecutively measured from the surface of the nickel-cobalt-iron diffusion layer 12 from the surface toward the steel sheet 11 in the depth direction by radio frequency glow discharge optical emission spectrometry under a predetermined measurement condition, and the concentration of Ni, the concentration of Co, and the concentration of Fe are determined at each of depth positions of the nickel-cobalt-iron diffusion layer 12 based on the obtained intensities for Ni, Co, and Fe, the Co concentration gradient $\Delta P_{Co}$ ranging from the depth position $D_{Co\_MAX}$ to the depth position $D_{Co\_15\%}$ is controlled to 33% by mass/0.1 μm or less, where the depth position at which the concentration of Co is maximum is defined as $D_{Co\_MAX}$ and the depth position which is located closer to the steel sheet 11 than the depth position $D_{Co\_MAX}$ and at which the concentration of Co is 15% of the maximum value is defined as $D_{Co\_15\%}$.

Here, how to determine the Co concentration gradient $\Delta P_{Co}$ will be described with reference to FIGS. 5(A), 5(B), and 6(A).

First, to set the measurement condition for performing radio frequency glow discharge optical emission spectrometry, a sample for adjusting the measurement condition (a sample prepared by forming a nickel plating layer and a cobalt plating layer in sequence on a steel sheet) is prepared. The prepared sample for adjusting the measurement condition is measured from the surface of the cobalt plating layer toward the steel sheet by a radio frequency glow discharge optical emission spectrometer under a condition that provides substantially identical levels of maximum intensity for Ni, Co, and Fe (i.e., the intensity for Ni in a region of the nickel plating layer where Ni is detected as a simple substance, the intensity for Co in a region of the cobalt plating layer where Co is detected as a simple substance, and the intensity for Fe in a region of the steel sheet where Fe is detected as a simple substance are substantially the same). One example of the measured results is shown in FIG. 5(A). In FIG. 5(A), the ordinate represents the intensity, and the abscissa represents the etching depth when measurement in the depth direction is performed with a radio frequency glow discharge optical emission spectrometer while sputtering with Ar plasma being performed from the surface of the surface-treated steel sheet 1. A usable method of adjusting the maximum values of the intensities for Ni, Co, and Fe to be substantially the same can be a method of adjusting the voltage (H.V.) of the photomultiplier tube channel in the radio frequency glow discharge optical emission spectrometer for each element to be measured.

Here, because the sputter rates with Ar plasma for nickel, cobalt, and iron are substantially the same, the amounts of etching of materials respectively composed of only nickel, only cobalt, and only iron are substantially the same when the materials are measured with a radio frequency glow discharge optical emission spectrometer under the same sputtering condition (Ar gas pressure (unit: Pa) and the output (unit: W)). Accordingly, the etching amount of nickel contributing to the intensity for Ni to be measured, that of cobalt contributing to the intensity for Co to be measured, and that of iron contributing to the intensity for Fe to be measured are substantially the same.

Figure 5A:
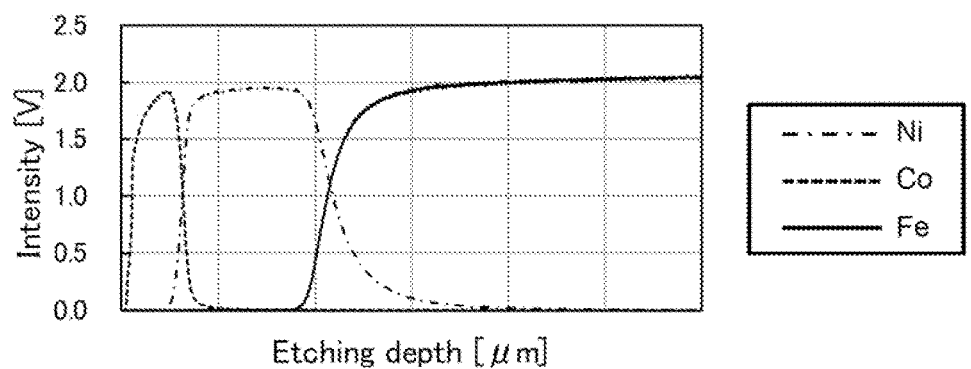
FIGS. 5(A), 5(B) and 5(C) show graphs for illustrating measurement by radio frequency glow discharge optical emission spectrometry.

For this reason, as shown in FIG. 5(A), by performing measurement with a radio frequency glow discharge optical emission spectrometer under a condition that provides substantially identical levels of maximum intensity for Ni, Co, and Fe (an intensity of about 2.0 V in the example shown in FIG. 5(A)), the intensity ratio determined from the obtained intensities for Ni, Co, and Fe can be used as they are as the mass ratio of Ni, Co, and Fe. For example, the proportion of the intensity for Fe in the total of the intensities for Ni, Co, and Fe can be used as it is as the proportion of the amount by mass of Fe (proportion (% by mass) of Fe) in the total amount by mass of Ni, Co, and Fe. The same applies to Ni and Co. In the present embodiment, the measurement condition (voltage of the photomultiplier tube channel) for the radio frequency glow discharge optical emission spectrometer is preliminarily set, and the surface-treated steel sheet 1 is measured under the set condition as above. Thereby, from the intensities for Ni, Co, and Fe, the Ni content, the Co content, and the Fe content relative to the total content of nickel, cobalt, and iron can be determined at each of depth positions (depth position determined from the time of measurement while performing sputtering).

For the measurement condition with a radio frequency glow discharge optical emission spectrometer, the maximum values of the intensities for Ni, Co, and Fe are adjusted to about 2.0 V in the example shown in FIG. 5(A). However, the maximum value of the intensity is not limited to 2.0 V and can be any value. If the value is too low, the sensitivity of measurement might be reduced. In contrast, if the value is too high, the obtained intensity might be saturated not to ensure a correct value. Thus, the H.V. is set to obtain a sufficient maximum intensity which does not cause saturation and insufficient sensitivity in the measurement of the sample for adjusting the measurement condition. Usually, the maximum value is within the range of ±1.0 V of the value measured at a recommended or guideline H.V. of the measuring instrument. The maximum value of the intensity for Ni when the H.V. for Ni was set to 630 V was used in the measurement in Examples described later. Preferably, the nickel plating layer and the cobalt plating layer in the sample for adjusting the measurement condition each have a thickness of 0.2 to 1.0 μm to sufficient intensity.

After the measurement condition for the radio frequency glow discharge optical emission spectrometer is set by the method shown in FIG. 5(A), the surface-treated steel sheet 1 according to the present embodiment is measured under the measurement condition, thereby determining the Ni content, the Co content, and the Fe content in the nickel-cobalt-iron diffusion layer 12.

Figure 5B:
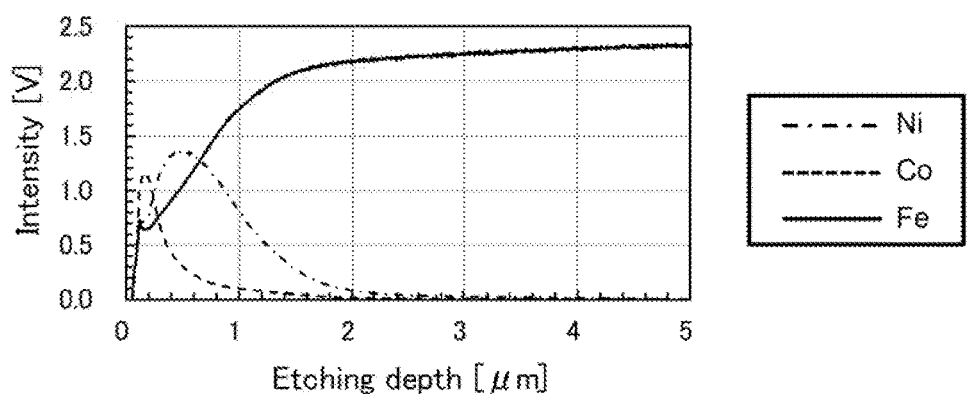

Here, FIG. 5(B) is a graph of the intensities for Ni, Co, and Fe obtained by consecutively measuring the surface-treated steel sheet 1 in Example 1 described later from the surface of the nickel-cobalt-iron diffusion layer 12 toward the steel sheet 11 in the depth direction under the above measurement condition by radio frequency glow discharge optical emission spectrometry. FIG. 6(A) is a graph created based on the data of the intensity for Co shown in FIG. 5(B) and showing the relation between the etching depth and the concentration of Co. FIG. 6(B) is a graph created based on the data of the intensity for Ni shown in FIG. 5(B) and showing the relation between the etching depth and the concentration of Ni. FIGS. 5(A), 5(B), 6(A), and 6(B) all are graphs where the abscissa represents the etching depth. The etching depth can be determined from the measurement condition (including the sputtering condition) for the radio frequency glow discharge optical emission spectrometry and the sputtering time. In other words, in a steel sheet having a nickel plating layer with a known amount of nickel deposited and not subjected to a heat treatment, the etching rate is calculated from the amount of nickel deposited and the sputtering time from the start of etching to the time when the intensity reaches 10% of the maximum value of the intensity for Fe. By using the same measurement condition as above, the etching depth can be determined based on the sputtering time of the surface-treated steel sheet.

The graph shown in FIG. 5(B) shows the results of measurement under the measurement condition above. Thus, the intensity ratio determined from the intensities for Ni, Co, and Fe can be used as it is as the mass ratio of Ni, Co, and Fe, and the proportion by mass of Ni, that of Co, and that of Fe, namely, the concentration of Ni, the concentration of Co, and the concentration of Fe in each of depth positions in the nickel-cobalt-iron diffusion layer 12 can be determined. Specifically, for example, the proportion (%) of the intensity for Ni in the total of the intensities for Ni, Co, and Fe (intensity for Ni/(intensity for Ni+intensity for Co+intensity for Fe)×100) can be used as the proportion by mass of Ni, i.e., the concentration of Ni. The proportion by mass of Co and that of Fe can also be determined in the same manner, and can also be used as the concentration of Co and that of Fe. FIG. 6(A) is a graph showing the concentration of Co determined as above (namely, the proportion by mass of Co in the total by mass of Ni, Co, and Fe) at each of depth positions of the nickel-cobalt-iron diffusion layer 12.

Figure 6:
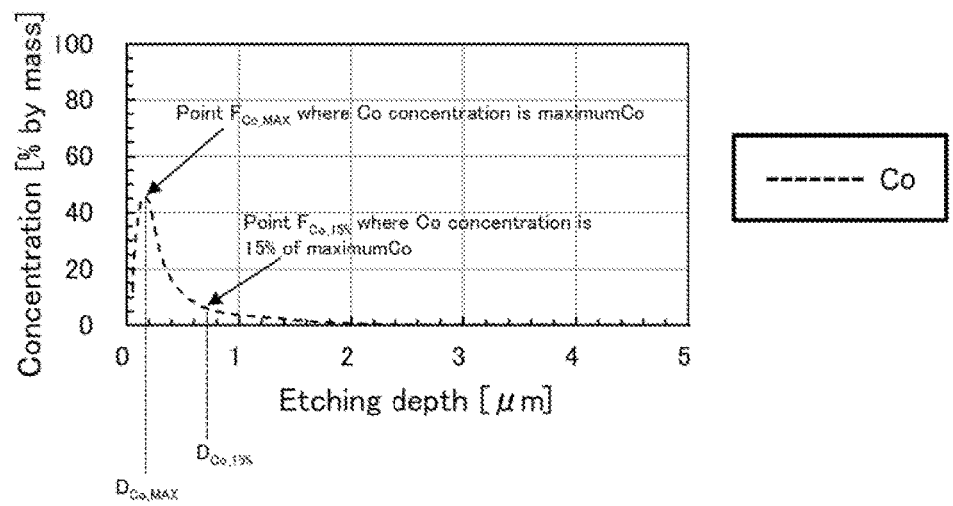
FIGS. 6(A), 6(B) and 6(C) show graphs for illustrating a method of determining the Co concentration gradient $\Delta P_{Co}$ and the Ni concentration gradient $\Delta P_{Ni}$.
Figure 6:
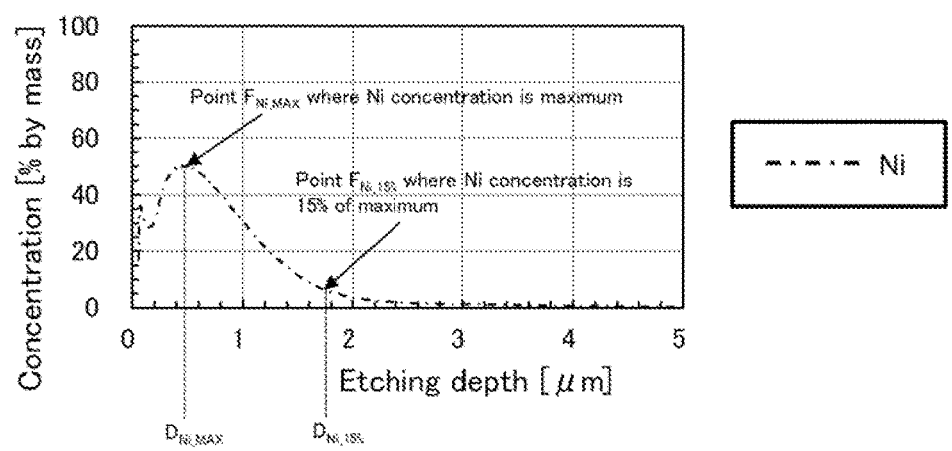
Figure 6:
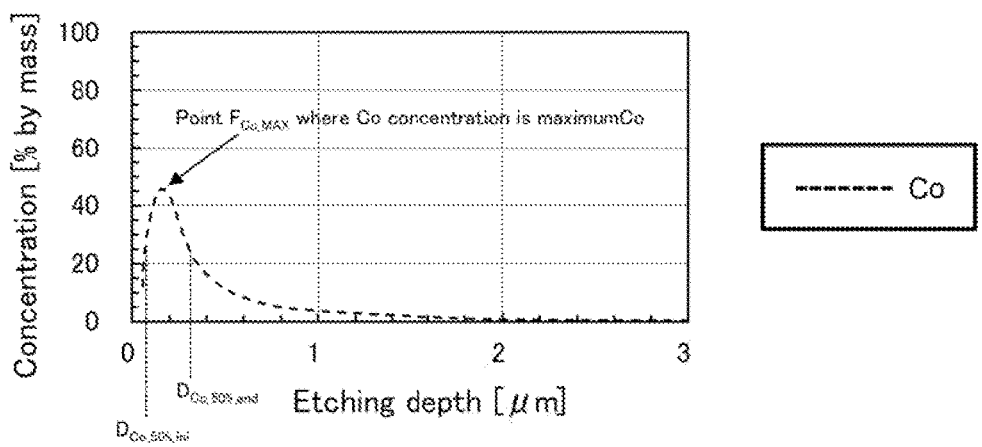

In the present embodiment, as shown in FIG. 6(A), when the Co concentration gradient $\Delta P_{Co}$ from the depth position $D_{Co\_MAX}$ to the depth position $D_{Co\_15\%}$ is determined, the Co concentration gradient $\Delta P_{Co}$ is controlled to 33% by mass/0.1 μm or less, where the depth position corresponding to a point $DF_{Co\_MAX}$ at which the concentration of Co is maximum is defined as $D_{Co\_MAX}$ and the depth position corresponding to a point $F_{Co\_MAX}$ which is located closer to the steel sheet 11 than the point $F_{Co\_MAX}$ (namely, in the deeper direction) and at which the concentration of Co is 15% of the maximum value at the point $F_{Co\_MAX}$ (depth position $D_{Co\_MAX}$) is defined as $D_{Co\_15\%}$. In other words, with reference to FIG. 6(A), the concentration of Co at the depth position $D_{Co\_MAX}$ (point $F_{Co\_MAX}$) is about 45% by mass. Thus, the concentration of Co at the depth position $D_{Co\_MAX}$ (point $F_{Co\_15\%}$) is about 6.75% by mass. The etching depth is around 0.2 μm at the depth position $D_{Co\_MAX}$ (point $F_{Co\_MAX}$), and the etching depth is around 0.7 μm at the depth position $D_{Co\_MAX}$ (point $F_{Co\_15\%}$). The Co concentration gradient $\Delta P_{Co}$ is 7.8% by mass/0.1 μm from calculation.

Namely, in Example 1 shown in FIG. 6(A), the result exhibits that the concentration of Co is reduced at a rate of 7.8% by mass per 0.1 from the depth position $D_{Co\_MAX}$ (point $F_{Co\_MAX}$) as the maximum to the depth position $D_{Co\_15\%}$ (point $F_{Co\_15\%}$) when measurement is performed in the deeper direction. As shown in FIG. 6(A), the reduction rate of the concentration of Co is not fixed. Thus, the Co concentration change rate in the present embodiment measured based on the concentrations of Co at two points of the depth position $D_{Co\_MAX}$ and the depth position $D_{Co\_15\%}$ is defined as Co concentration gradient $\Delta P_{Co}$. In other words, the Co concentration gradient $\Delta P_{Co}$ can be calculated by the expression "Co concentration gradient $\Delta P_{Co}$ (% by mass/0.1 µm)={Co concentration (% by mass) at depth position $D_{Co\_MAX}$–Co concentration (% by mass) at depth position $D_{Co\_15\%}$}/0.1×|depth (µm at depth position $D_{Co\_MAX}$)–depth (µm) at depth position $D_{Co\_15\%}$|".

In measurement with a radio frequency glow discharge optical emission spectrometer, in some cases, the sputter rate (and sputtering time) may be affected by the hardness of the target to be measured, and more particularly, the intensity to be measured may be more significantly affected by the depth (depth from the outermost layer to the measurement point) as the measurement point is located deeper from the outermost layer. Accordingly, for the surface-treated steel sheet 1 according to the present embodiment, the measurement was started under the measurement condition set by the method described in FIG. 5(A), and the intensity ratio of the elements at each of measurement points (each of depth positions) was determined as the proportion of the contents of the elements. Moreover, numeric values may be generally varied depending on the state of the anode in some cases even if the measurement is performed under the same sputter condition at the same H.V. Although the maximum value of the intensity was adjusted to about 2.0 V in the example shown in FIG. 5(A), for example, the maximum value of the intensity may not reach 2.0 V in some cases when the nickel-cobalt-iron diffusion layer 12 in the surface-treated steel sheet 1 actually prepared is measured. However, this case is not problematic because the intensity ratio of the elements at each measurement point is determined as the proportion of the elements as described above.

In the present embodiment, the Co concentration gradient $\Delta P_{Co}$ thus calculated is controlled to 33% by mass/0.1 µm or less. Thereby, the surface-treated steel sheet 1, when formed into a battery case having an inner surface composed of the nickel-cobalt-iron diffusion layer 12, can ensure low internal resistance and high battery characteristics of the resulting battery, as well as high corrosion resistance to the electrolyte solution. Moreover, the surface-treated steel sheet 1 can also suppress a reduction in battery characteristics even after a lapse of time.

Namely, it is conventionally known that when iron is exposed on the inner surface of a battery case formed with a surface-treated steel sheet 1 for battery cases including an iron-nickel diffusion layer formed on the surface thereof such that the iron-nickel diffusion layer corresponds to the inner surface of the battery case, the resulting battery is excellent in battery characteristics, compared with the case where no iron is exposed. However, if the amount of iron exposed on the inner surface of the battery case is too large, the following trouble might arise: The proportion of nickel present in the inner surface of the battery case might reduce along with the increase in amount of iron, and iron might dissolve out into the electrolyte solution when the battery is stored or used over a long period. Gases generated due to the dissolving-out of iron might increase the internal pressure of the battery to cause leakage of the electrolyte solution through a seal. Further, due to a reduction in proportion of nickel present in the inner surface of the battery case, the rustproofness thereof against air might reduce if the sheet is stored before formation into the battery case or stored in the form of a battery case.

Another method is also conventionally known, in which a nickel-cobalt alloy layer is formed on the surface of the surface-treated steel sheet for battery cases, and a battery case including the nickel-cobalt alloy layer as the inner surface thereof is produced. In this case, it is known that the battery characteristics are improved by increasing the cobalt content in the nickel-cobalt alloy layer. However, if the cobalt content in the nickel-cobalt alloy layer is increased, cobalt is more likely to dissolve out from the inner surface of the battery case simply because of the increase in cobalt content, and the nickel content is reduced along with the increase in cobalt content. This results in an increase in amount of cobalt not alloyed with nickel, also causing cobalt to more readily dissolve out.

In short, it is conventionally known that the battery characteristics of the resulting battery can be improved by forming an iron-nickel diffusion layer or a nickel-cobalt alloy layer as the inner surface of the battery case and increasing the iron or cobalt content in these layers. However, these cases have problems that the rustproofness and the corrosion resistance to an electrolyte solution are reduced since the content of nickel reduces along with the incorporation of iron or cobalt.

In contrast, according to the present embodiment, the nickel-cobalt-iron diffusion layer 12 including three coexisting elements of nickel, cobalt, and iron is formed on the surface-treated steel sheet 1, and the Co concentration gradient $\Delta P_{Co}$ between the depth position $D_{Co\_MAX}$ at which the concentration of Co is maximum and the depth position $D_{Co\_15\%}$ at which the concentration of Co is 15% of the maximum value is controlled within the range specified above. Owing to this, even if the proportion of the content of nickel contributing to an improvement in rustproofness and corrosion resistance to an electrolyte solution is relatively low, an effect of improving the battery characteristics by iron suitably exposed from the inner surface of the battery case can be ensured while the corrosion resistance to the electrolyte solution can be enhanced, and a reduction in battery characteristics can also be suppressed even after a lapse of time.

In particular, the present inventors have found that the corrosion resistance to the electrolyte solution is determined not only by the compositional ratio of nickel, cobalt, and iron on the surface or the nickel and cobalt contents. More specifically, the present inventors have found unknown problems as follows: The nickel-cobalt-iron diffusion layer exhibits a different distribution of cobalt depending on the production condition. Furthermore, in some cases, the cobalt concentration may have a sharp gradient because cobalt does not diffuse across the entire thickness of the nickel-cobalt-iron diffusion layer depending on the production condition, resulting in formation of a region having a partially high cobalt content in the thickness direction. As a result, the corrosion resistance to the electrolyte solution is likely to reduce in such a case, even if the cobalt content on the surface of the nickel-cobalt-iron diffusion layer is low. In particular, such a distribution is likely to appear when cobalt cannot be sufficiently diffused in the thickness direction, and is also likely to appear when the cobalt concentration on the plating surface before a heat treatment is high, particularly when a cobalt plating layer is formed on the steel sheet before a heat treatment. Such a phenomenon is probably caused because cobalt is more difficult to diffuse than nickel. Thus, the present inventors have found that the cobalt concentration gradient should be moderated by sufficiently diffusing iron contained in the steel sheet as the substrate. In other words, the present inventors have found that to ensure compatibility between improved battery characteristics and corrosion resistance to the electrolyte solution by forming the nickel-cobalt-iron diffusion layer, the cobalt concentration gradient should be controlled to fall within a specific range by appropriately combining the plating configuration, the amount of plating deposited, and the heat treatment condition, and particularly that the cobalt concentration gradient should be controlled to be sufficiently low if a production method of forming a nickel plating layer and a cobalt plating layer, and then forming a nickel-cobalt-iron diffusion layer by a heat treatment is selected as a production method in which the total amount of nickel and cobalt deposited is easily controlled. In such a view, the present inventors have focused on the Co concentration gradient $\Delta P_{Co}$, and have completed the present invention.

Moreover, according to the present embodiment, by controlling the Co concentration gradient $\Delta P_{Co}$ to 33% by mass/0.1 μm or less, as described above, low internal resistance and high corrosion resistance to the electrolyte solution can be ensured, and discoloration over time can be significantly reduced, thus suppressing a reduction in quality of products caused by such discoloration.

The Co concentration gradient $\Delta P_{Co}$ may be 33% by mass/0.1 μm or less, and is preferably 30% by mass/0.1 μm or less, more preferably 27% by mass/0.1 μm or less, more preferably 24% by mass/0.1 μm or less. Although not particularly limited, the lower limit of the Co concentration gradient $\Delta P_{Co}$ is preferably 0.1% by mass/0.1 μm or more, more preferably 2% by mass/0.1 μm or more. In the present embodiment, the Co concentration gradient $\Delta P_{Co}$ is expressed by "% by mass/0.1 μm" in unit, namely, by a change rate in % by mass per 0.1 μm.

In the present embodiment, iron in the nickel-cobalt-iron is preferably diffused from the steel sheet. If iron in the nickel-cobalt-iron is diffused from the steel sheet, the concentration of Fe monotonously increases from the etching depth at which the concentration of Co is maximum toward the steel sheet. Here, the expression "monotonously increase" indicates that the content does not reduce halfway, and the increase rate does not need to be fixed.

In the present embodiment, preferably, the surface-treated steel sheet 1 has the Ni concentration gradient $\Delta P_{Ni}$ controlled to 15% by mass/μm or more while having the Co concentration gradient $\Delta P_{Co}$ controlled within the range specified above. In other words, when the concentration of Ni, the concentration of Co, and the concentration of Fe at each of depth positions of the nickel-cobalt-iron diffusion layer 12 are determined by measuring the surface-treated steel sheet 1 by radio frequency glow discharge optical emission spectrometry in the same manner as above, the Ni concentration gradient $\Delta P_{Ni}$ from the depth position $D_{Ni\_MAX}$ to the depth position $D_{Ni\_15\%}$ is preferably controlled to 15% by mass/μm or more, where a depth position at which the concentration of Ni is maximum is defined as $D_{Ni\_MAX}$, and a depth position which is located closer to the steel sheet 11 than the depth position $D_{Ni\_MAX}$ and at which the concentration of Ni is 15% of the maximum value is defined as $D_{Ni\_15\%}$.

Here, the Ni concentration gradient $\Delta P_{Ni}$ can be determined as in the Co concentration gradient $\Delta P_{Co}$, and a specified method will be described below. Namely, as shown in FIG. 6(B), the Ni concentration gradient $\Delta P_{Ni}$ can be determined by calculating the Ni concentration change rate from the depth position $D_{Ni\_MAX}$ to the depth position $D_{Ni\_15\%}$, where the depth position corresponding to point $F_{Ni\_MAX}$ which the concentration of Ni is maximum is defined as $D_{Ni\_MAX}$, and the depth position corresponding to the point $F_{Ni\_15\%}$ which is located closer to the steel sheet 11 than the point $F_{Ni\_MAX}$ (namely, the deeper direction) and at which the concentration of Ni is 15% of the maximum value of the concentration of Ni at the point $F_{Ni\_MAX}$ (depth position $D_{Ni\_MAX}$) is defined as $D_{Ni\_15\%}$. As shown in FIG. 6(B), the reduction rate of the concentration of Ni is not fixed. Thus, in the present embodiment, the change rate calculated based on the concentrations of Ni at two points of the depth position $D_{Ni\_MAX}$ and the depth position $D_{Ni\_15\%}$ is defined as Ni concentration gradient $\Delta P_{Ni}$. Namely, the concentration gradient can be calculated by the expression "Ni concentration gradient $\Delta P_{Ni}$ (% by mass/μm)={Ni concentration (% by mass) at depth position $D_{Ni\_MAX}$–Ni concentration (% by mass) at depth position $D_{Ni\_15\%}$}/|depth (μm) at depth position $D_{Ni\_MAX}$–depth (μm) at depth position $D_{Ni\_15\%}$|".

The Ni concentration gradient $\Delta P_{Ni}$ is preferably 15% by mass/μm or more, more preferably 17% by mass/μm or more, still more preferably 18% by mass/μm or more, particularly preferably 20% by mass/μm or more. Although not particularly limited, the upper limit of the Ni concentration gradient $\Delta P_{Ni}$ is preferably 90% by mass/μm or less, more preferably 80% by mass/μm or less, still more preferably 50% by mass/μm or less. In the present embodiment, the Ni concentration gradient $\Delta P_{Ni}$ is expressed by "% by mass/μm" in unit, i.e., by the change rate of % by mass per 1 μm. For example, when the Ni concentration gradient $\Delta P_{Ni}$ is 30% by mass/μm, this indicates that the concentration of Ni is reduced at a rate of 30% by mass per 1 μm (rate of 3% by mass per 0.1 μm) from the depth position $D_{Ni\_MAX}$ (point $F_{Ni\_MAX}$) as the maximum to the depth position $D_{Ni\_15\%}$ iso (point $F_{Ni\_15\%}$) when measurement is performed in the deeper direction.

In the present embodiment, when the concentration of Ni, the concentration of Co, and the concentration of Fe are determined by measuring the surface-treated steel sheet 1 by radio frequency glow discharge optical emission spectrometry in the same manner as above, the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$ at the depth position $D_{Ni\_0.5\%}$ are preferably controlled within specific ranges, where among the depth positions at which the concentration of Ni in the nickel-cobalt-iron diffusion layer 12 is 0.5% of the maximum value, the depth position located closest to the surface is defined as $D_{Ni\_0.5\%}$. In such a configuration, when used as a battery case for a battery containing a strongly alkaline electrolyte solution, the surface-treated steel sheet 1 can ensure higher battery characteristics, and can more significantly suppress a reduction in battery characteristics after a lapse of time.

Here, as described above, the graph shown in FIG. 5(B) shows changes in the intensities for Ni, Co, and Fe in the etching depth direction. The intensities for Ni, Co, and Fe shown in the graph of FIG. 5(B) can be directly converted into the amount of by mass of Ni, the amount of by mass of Co, and the amount of by mass of Fe, respectively. For this reason, in the present embodiment, based on the graph of the intensities for Ni, Co, and Fe as above, the Ni concentration $P_{Ni}(D_{Ni\_0.5\%})$ the Co concentration $P_{Co}(D_{Ni\_0.5\%})$ and the Fe concentration $P_{Fe}(D_{Ni\_0.5\%})$ at the depth position $D_{Ni\_0.5\%}$ at which the intensity for Ni in the nickel-cobalt-iron diffusion layer 12 is 0.5% of the maximum value can be determined by the method described below. In the present embodiment, these are suitably controlled within the ranges described later.

Figure 5C:
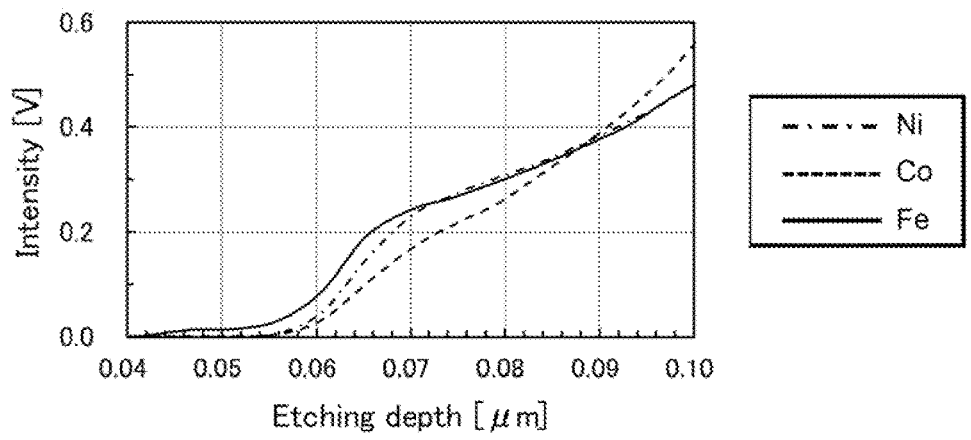

Hereinafter, the method of measuring the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$ will be described in detail. First, as shown in FIG. 5(B), the nickel-cobalt-iron diffusion layer 12 containing coexisting Ni, Co, and Fe is present in a surface layer portion (a region extending over an etching depth range of about 0 to 2.5 μm) of the surface-treated steel sheet 1 in Example 1 according to FIG. 5(B). As described above, the nickel-cobalt-iron diffusion layer 12 can be formed, for example, by forming a nickel plating layer and a cobalt plating layer in sequence on the surface of the steel sheet 11, and then performing a heat treatment under a specific condition. The heat treatment causes thermal diffusion of iron in the steel sheet 11 to the outer surface. For such a nickel-cobalt-iron diffusion layer 12, the maximum value of the intensity for Ni is extracted to specify a depth position at which the intensity is 0.5% of the extracted maximum value, as the depth position $D_{Ni\_0.5\%}$. If several depth positions at which the intensity is 0.5% of the maximum value are present, among these, a position closest to the surface of the nickel-cobalt-iron diffusion layer 12 is specified as the depth position $D_{Ni\_0.5\%}$. Specifically, in the graph of FIG. 5(B), the maximum value of the intensity for Ni is found at an etching depth position of around 0.47 μm, and the intensity is about 1.36 V. Based on this, 0.5% of the maximum value (1.36 V) of the intensity for Ni is 0.00679 V. From the graph shown in FIG. 5(C), which is a partially enlarged graph of that shown in FIG. 5(B), the depth position $D_{Ni\_0.5\%}$ at which the intensity for Ni is 0.00679 V is specified as an etching depth of around 0.055 μm. To be noted, because the actual data taking interval in measurement was set at about 0.00465 μm in Example 1 shown in FIGS. 5(B) and 5(C), the depth position having a value closest to 0.5% of the intensity was defined as a specific depth position $D_{Ni\_0.5\%}$ at which the intensity for Ni was 0.5% of the maximum value thereof (in Example 1 shown in FIG. 5(C), an etching depth of 0.0558 μm was the closest value). According to examination by the present inventors, the proportions of intensities of the elements at a depth position of 0.055 μm were identical to those at a depth position of 0.0558 μm. The Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$ at the depth position $D_{Ni\_0.5\%}$ can be calculated by the method above. In the present embodiment, the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$ at the depth position $D_{Ni\_0.5\%}$ are focused because it can be determined that these concentrations at the depth position $D_{Ni\_0.5\%}$ represent the proportion of the concentrations in the surface layer (the outermost layer and near the outermost layer) of the nickel-cobalt-iron diffusion layer 12. The present inventors have found that when the surface-treated steel sheet including the nickel-cobalt-iron diffusion layer according to the present embodiment is analyzed with a radio frequency glow discharge optical emission spectrometer, the intensity obtained at the measurement start point is unstable due to influences from surface roughness or the like while irrespective of the target to be measured, the intensity is obtained stably to some extent by etching to a depth at which the intensity for Ni is 0.5% of the maximum value. As described above, in the present embodiment, the etching depth at which the intensity for Ni is 0.5% of the maximum value is 0.01 to 0.1 μm, and is the outermost layer of the nickel-cobalt-iron diffusion layer and the vicinity of the outermost layer. In other words, the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$ substantially represent the concentration of Ni, that of Co, and that of Fe on the outer surface of the nickel-cobalt-iron diffusion layer 12, respectively.

In the present embodiment, the Co concentration $P_{Co}(D_{Ni\_0.5\%})$ at the depth position $D_{Ni\_0.5\%}$ is preferably 5% by mass or more, more preferably 12% by mass or more, still more preferably 16% by mass or more, particularly preferably 20% by mass or more because the battery characteristics after a lapse of time can be further improved. The upper limit of the Co concentration $P_{Co}(D_{Ni\_0.5\%})$ is preferably 65% by mass or less, more preferably 55% by mass or less, still more preferably 39% by mass or less, particularly preferably 30% by mass or less because a reduction in corrosion resistance can be suppressed by suppressing dissolving-out of cobalt when the surface-treated steel sheet 1 is used as a battery case.

The Fe concentration $P_{Fe}(D_{Ni\_0.5\%})$ at the depth position $D_{Ni\_0.5\%}$ is preferably 15% by mass or more, more preferably 20% by mass or more, still more preferably 25% by mass or more, particularly preferably 30% by mass or more because higher battery characteristics of the resulting battery can be ensured. The lower limit of the Fe concentration $P_{Fe}(D_{Ni\_0.5\%})$ is preferably 90% by mass or less, more preferably 85% by mass or less, still more preferably 75% by mass or less, particularly preferably 70% by mass or less because a reduction in corrosion resistance can be suppressed by suppressing dissolving-out of iron when the surface-treated steel sheet 1 is used as a battery case.

Furthermore, in the present embodiment, the Ni concentration $P_{Ni}(D_{Ni\_0.5\%})$ in the depth position $D_{Ni\_0.5\%}$ is preferably 70% by mass or less, more preferably 60% by mass or less, still more preferably 55% by mass or less, particularly preferably 50% by mass or less because an increase in contact resistance can be suppressed and the battery characteristics can be improved when the surface-treated steel sheet 1 is used as a battery case. The lower limit of the Ni concentration $P_{Ni}(D_{Ni\_0.5\%})$ is preferably 5% by mass or more, more preferably 7% by mass or more, still more preferably 10% by mass or more, particularly preferably 12% by mass or more because dissolving-out of cobalt and iron can be more appropriately suppressed when the surface-treated steel sheet 1 is used as a battery case.

In the surface-treated steel sheet 1 according to the present embodiment, the lower limit of the ratio $R_{Fe/Co}$ of the Fe concentration $P_{Fe}(D_{Ni\_0.5\%})$ to the Co concentration $P_{Co}(D_{Ni\_0.5\%})$ ($P_{Fe}(D_{Ni\_0.5\%})/P_{Co}(D_{Ni\_0.5\%})$) is preferably 0.5 or more, more preferably 0.8 or more, still more preferably 1.0 or more, and the upper limit thereof is preferably 20 or less, more preferably 14 or less, still more preferably 8.0 or less. By controlling the ratio $R_{Fe/Co}$ within the range above, the effect of improving the battery characteristics of the resulting battery and the effect of improving the corrosion resistance to the electrolyte solution can be more highly balanced.

Moreover, the Fe concentration $P_{Fe}(D_{Ni\_0.5\%})$ is controlled to preferably 55% by mass or more, more preferably 65% by mass or more because the initial battery characteristics can be further improved. In this case, to suppress dissolving-out to the electrolyte solution, additionally, the Co concentration $P_{Co}(D_{Ni\_0.5\%})$ is preferably 5% by mass or more, the cobalt content in the nickel-cobalt-iron diffusion layer 12 described later is preferably 0.2 g/m² or more, and further, the total content of nickel and cobalt in the nickel-cobalt-iron diffusion layer 12 is preferably 1.6 g/m² or more. At this time, to improve the battery characteristics after a lapse of time, the cobalt content in the nickel-cobalt-iron diffusion layer 12 is more preferably 0.5 g/m² or more, still more preferably 0.7 g/m² or more. By controlling the cobalt content to the value above, higher battery characteristics after a lapse of time can be ensured not only due to the Co content in the surface layer but also due to a predetermined amount of cobalt contained in the diffusion layer.

Figure 7:
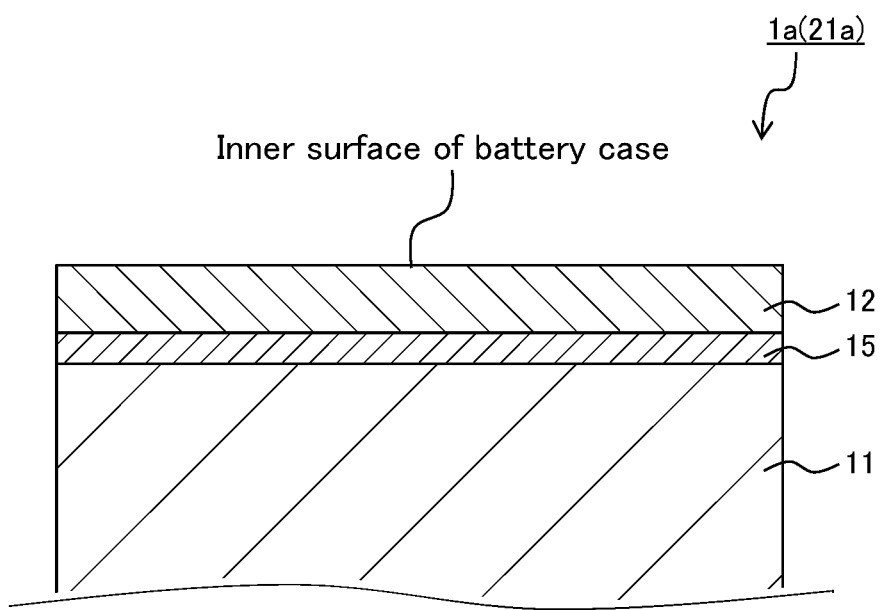
FIG. 7 is a cross-sectional view showing a second embodiment of the surface-treated steel sheet according to the present invention.

In the present embodiment, an iron-nickel diffusion layer 15 may be further included between the steel sheet 11 and the nickel-cobalt-iron diffusion layer 12 as in a surface-treated steel sheet 1a shown in FIG. 7. Such a configuration can further improve the corrosion resistance to the electrolyte solution when such a surface-treated steel sheet 1a is used as a battery case.

To be noted, in the surface-treated steel sheet 1a according to the present embodiment, the presence of the iron-nickel diffusion layer 15 can be confirmed by the following method. Specifically, the intensities for Ni, Co, and Fe are sequentially measured in the depth direction from the surface of the nickel-cobalt-iron diffusion layer 12 toward the steel sheet 11 by radio frequency glow discharge optical emission spectrometry on the surface-treated steel sheet 1a using the same method as in the above-mentioned FIG. 5(B). At this time, when there is a region from a starting depth point where the intensity for Co measured in the depth direction from the surface of the nickel-cobalt-iron diffusion layer 12 is 15% of the maximum value after reaching the maximum value to a depth point where the intensity for Ni measured in the depth direction from the surface of the nickel-cobalt-iron diffusion layer 12 is 15% of the maximum value thereof after reaching the maximum value, such a depth region can be determined as a diffusion layer comprising iron and nickel without cobalt, that is, an iron-nickel diffusion layer; and in this case, it can be determined that the iron-nickel diffusion layer is present. Here, in the measurement by a radio frequency glow discharge optical emission spectrometer, information of elements from side walls in an etched spot becomes liable to be taken in along with progress of the etching and the elements present in the surface layer are liable to be detected as noises. Accordingly, in the case where the intensity of each element is 15% or less of the maximum value at depths other than and much deeper than the surface layer and the vicinity of the surface layer, the element can usually be considered to be almost absent.

In the present embodiment, the lower limit of the cobalt content in the nickel-cobalt-iron diffusion layer 12 is preferably 0.2 $g/m^2$ or more, more preferably 0.5 $g/m^2$ or more, still more preferably 0.7 $g/m^2$ or more to further improve the battery characteristics. The upper limit of the cobalt content is preferably 5.0 $g/m^2$ or less, more preferably 3.0 $g/m^2$ or less, still more preferably 2.0 $g/m^2$ or less to suppress excess dissolving-out of cobalt from the diffusion layer.

When the iron-nickel diffusion layer 15 is formed, the lower limit of the total content of nickel contained in the nickel-cobalt-iron diffusion layer 12 and the iron-nickel diffusion layer 15 is preferably 1.0 $g/m^2$ or more, more preferably 1.3 $g/m^2$ or more, still more preferably 1.6 $g/m^2$ or more to improvise corrosion resistance. The upper limit of the total content of nickel contained in the nickel-cobalt-iron diffusion layer 12 and the iron-nickel diffusion layer 15 is preferably 12.5 $g/m^2$ or less, more preferably 9.5 $g/m^2$ or less, still more preferably 8.5 $g/m^2$ or less, particularly preferably 7.0 $g/m^2$ or less because an excessively large content thereof may obstruct exposure of iron or stable control of the proportions.

When the iron-nickel diffusion layer 15 is not formed, the lower limit of the nickel content in the nickel-cobalt-iron diffusion layer 12 is preferably 0.2 $g/m^2$ or more, more preferably 0.5 $g/m^2$ or more, still more preferably 0.7 $g/m^2$ or more to improve the corrosion resistance. When the iron-nickel diffusion layer 15 is not formed, the upper limit of the nickel content in the nickel-cobalt-iron diffusion layer 12 is preferably 11.3 $g/m^2$ or less, more preferably 9.5 $g/m^2$ or less, still more preferably 8.5 $g/m^2$ or less, particularly preferably 7.0 $g/m^2$ or less because an excessively large content thereof may obstruct exposure of iron and stable control of the proportions.

The lower limit of the total content of nickel and cobalt contained in the nickel-cobalt-iron diffusion layer 12 (the total amount of nickel and cobalt contained in the nickel-cobalt-iron diffusion layer 12 and the iron-nickel diffusion layer 15 when the iron-nickel diffusion layer 15 is formed) is preferably 1.6 $g/m^2$ or more, more preferably 2.5 $g/m^2$ or more, still more preferably 3.0 $g/m^2$ or more, particularly preferably 3.5 $g/m^2$ or more to suppress dissolving-out from the base iron. The upper limit of the total content of nickel and cobalt is preferably 14.0 $g/m^2$ or less, more preferably 10.0 $g/m^2$ or less, still more preferably 9.0 $g/m^2$ or less, particularly preferably 7.5 $g/m^2$ or less because an excessively large content thereof may obstruct exposure of iron and stable control of the proportions.

The nickel content and the cobalt content described above can be determined, for example, by subjecting the surface-treated steel sheets 1 and 1a to fluorescence X-ray analysis, and measuring the amounts of nickel and cobalt deposited based on a calibration curve preliminarily created.

Semi-quantitative analysis (calculation of the compositional proportions of any elements) by fluorescence X-ray analysis may also be performed in the measurement of the amounts thereof deposited. Because the X-ray penetration depth is 10 μm or more, the resulting proportion unintentionally includes iron in the substrate even in the measurement from the outermost layer if the total content of nickel and cobalt in the nickel-cobalt-iron diffusion layer 12 is 14.0 $g/m^2$ or less. For example, if fluorescence X-ray analysis is performed on the surface-treated steel sheet in Example 1 described later (the surface-treated steel sheet having a Ni concentration $P_{Ni}(D_{Ni\_0.5\%})$ of 23.50% by mass, a Co concentration $P_{Co}(D_{Ni\_0.5\%})$ of 15.14% by mass, and a Fe concentration $P_{Fe}(D_{Ni\_0.5\%})$ of 61.37% by mass, which were determined by radio frequency glow discharge optical emission spectrometry), the proportions of nickel, cobalt, and iron are 13.6% by mass, 5.6% by mass, and 80.8% by mass, respectively. The results of measurement by fluorescence X-ray analysis are different from those by radio frequency glow discharge optical emission spectrometry. Accordingly, particularly when iron is exposed on the surface layer, the proportion calculated from the amount of plating deposited or by fluorescence X-ray analysis is different from that of the surface layer (the outermost layer and near the outermost layer) analyzed by radio frequency glow discharge optical emission spectrometry. In contrast, the proportion on the surface layer (the outermost layer and near the outermost layer) can be appropriately analyzed by radio frequency glow discharge optical emission spectrometry.

The surface-treated steel sheets 1 and 1a according to the present embodiment have such a configuration.

The surface-treated steel sheets 1 and 1a according to the present embodiment, when used, are formed into the positive electrode can 21 for the alkali battery 2 shown in FIGS. 1 and 2 or a battery case for an other battery by a deep drawing process, a drawing and ironing process (DI work process), a drawing and thin-redrawing process (DTR work process), a combined work process of stretching work and ironing work after drawing work, or the like such that the nickel-cobalt-iron diffusion layer 12 serves the inner surface of the case.

The battery case according to the present embodiment includes the surface-treated steel sheets 1 or 1a according to the present embodiment, and thus, when used in a battery, can ensure a low internal resistance and high battery characteristics. The battery case can ensure high corrosion resistance to the strongly alkaline electrolyte solution, can suppress a reduction in battery characteristics even after a lapse of time, and can be suitably used as a battery case for batteries containing a strongly alkaline electrolyte solution. Although the surface-treated steel sheets 1 and 1a according to the present embodiment are used as a member for an alkali battery in the example described above, their application is not limited to alkali batteries. The surface-treated steel sheets 1 and 1a according to the present embodiment can be suitably used as a battery case for batteries containing a strongly alkaline electrolyte solution. In particular, the battery case according to the present embodiment can be suitably used as a battery case for batteries which include a mechanism for releasing gas generated inside the batteries. Even if in extremely trace amounts of cobalt and iron might dissolve out from the nickel-cobalt-iron diffusion layer 12 formed on the inner surface of the battery case according to the present embodiment to generate trace amounts of gases, such batteries including a gas releasing mechanism can appropriately release the generated gases.

<Method for Producing Surface-Treated Steel Sheet>

Next, the method for producing the surface-treated steel sheet 1 according to the present embodiment will be described.

First, a steel sheet 11 is prepared, and is nickel plated to form a nickel plating layer 13 on the surface of the steel sheet 11 which corresponds to the inner surface of a battery case, as shown in FIG. 4. The nickel plating layer 13 is preferably formed not only on the surface of the steel sheet 11 corresponding to the inner surface of the battery case but also on the opposite surface thereof. When the nickel plating layer 13 is formed on both surfaces of the steel sheet 11, plating baths having different compositions may be used for the surface of the steel sheet 11 corresponding to the inner surface of the battery case and that corresponding to the outer surface of the battery case, respectively, to form nickel plating layers 13 having different compositions, surface roughnesses, and the like. To improve production efficiency, however, the nickel plating layer 13 may be formed on both surfaces of the steel sheet 11 in a single step using the same plating bath.

Although the nickel plating bath for forming the nickel plating layer 13 is not particularly limited, plating baths usually used in electrolytic nickel plating, such as a Watts bath, a sulfamine bath, a fluoroboride bath, a chloride bath, and a citric acid bath, can be used. For example, the nickel plating layer 13 can be formed using a Watts bath comprising 200 to 350 g/L of nickel sulfate, 20 to 60 g/L of nickel chloride, and 10 to 50 g/L of boric acid at a pH of 3.0 to 4.8 (preferably pH of 3.6 to 4.6), at a bath temperature of 50 to 70° C., and at a current density of 0.5 to 60 A/dm$^2$ (preferably 1 to 40 A/dm$^2$).

The nickel content in the nickel plating layer 13 may be 12.5 g/m$^2$ or less, and is preferably 10.0 g/m$^2$ or less, more preferably 9.0 g/m$^2$ or less, still more preferably 8.8 g/m$^2$ or less. Here, the nickel content can be determined by performing X-ray fluorescence analysis on the steel sheet 11 having the nickel plating layer 13 formed thereon, and measuring the amount of nickel atoms deposited, which form the nickel plating layer 13. Although not particularly limited, the lower limit of the nickel content in the nickel plating layer 13 is preferably 0.2 g/m$^2$ or more, more preferably 0.4 g/m$^2$ or more, still more preferably 0.8 g/m$^2$ or more, further still more preferably 1.2 g/m$^2$ or more. The nickel content is particularly preferably 1.6 g/m$^2$ or more to further enhance the corrosion resistance. By controlling the nickel content in the nickel plating layer 13 within such a range, iron constituting the steel sheet 11 can thermally diffuse successfully through the nickel plating layer 13 to the surface of the cobalt plating layer 14 by a heat treatment when the nickel-cobalt-iron diffusion layer 12 is formed by forming the cobalt plating layer 14 on the nickel plating layer 13 as described later and performing the heat treatment thereon. As a result, the nickel-cobalt-iron diffusion layer 12 can be successfully formed.

Next, the steel sheet 11 having the nickel plating layer 13 famed thereon is cobalt plated to form cobalt plating layer 14.

Although the cobalt plating bath for forming the cobalt plating layer 14 is not particularly limited, the cobalt plating layer 14 can be famed using a cobalt plating bath comprising 200 to 300 g/L of cobalt sulfate, 50 to 150 g/L of cobalt chloride, 10 to 50 g/L of sodium chloride, and 10 to 60 g/L of boric acid at a pH of 2 to 5, a bath temperature of 40 to 80° C., and a current density of 1 to 40 A/dm$^2$.

Although not particularly limited, the lower limit of the cobalt content in the cobalt plating layer 14 is preferably 0.2 g/m$^2$ or more, more preferably 0.4 g/m$^2$ or more, still more preferably 0.6 g/m$^2$ or more, further still more preferably 0.8 g/m$^2$ or more. The lower limit is particularly preferably 1.0 g/m$^2$ or more to further enhance the corrosion resistance. Although not particularly limited, the upper limit is preferably 5.0 g/m$^2$ or less, more preferably 3.0 g/m$^2$ or less, still more preferably 2.0 g/m$^2$ or less to suppress excessive dissolving-out of cobalt from the diffusion layer. By controlling the cobalt content in the cobalt plating layer 14 within such a range, iron constituting the steel sheet 11 can thermally diffuse successfully through the nickel plating layer 13 to the surface of the cobalt plating layer 14 by a heat treatment when the heat treatment is performed on the steel sheet 11 having the nickel plating layer 13 and the cobalt plating layer 14 formed thereon as described later. As a result, the nickel-cobalt-iron diffusion layer 12 can be successfully formed.

Next, the steel sheet 11 having the nickel plating layer 13 and the cobalt plating layer 14 formed thereon is subjected to a heat treatment. Thereby, iron constituting the steel sheet 11, nickel constituting the nickel plating layer 13, and nickel and cobalt constituting the cobalt plating layer 14 are mutually thermally diffused to form the nickel-cobalt-iron diffusion layer 12. Thus, as shown in FIG. 3, the surface-treated steel sheet 1 including the nickel-cobalt-iron diffusion layer 12 formed on the steel sheet 11 is obtained. Alternatively, depending on the nickel content in the nickel plating layer 13, the total content of nickel and cobalt contained in the cobalt plating layer 14, and the condition for the heat treatment, the surface-treated steel sheet 1a including the iron-nickel diffusion layer 15 between the steel sheet 11 and the nickel-cobalt-iron diffusion layer 12 is obtained, as shown in FIG. 7.

The heat treatment condition may be appropriately selected depending on the nickel content in the nickel plating layer 13 and the total content of nickel and cobalt contained in the cobalt plating layer 14. In other words, a heat treatment condition which ensures a heat quantity to sufficiently diffuse the iron in the steel sheet may be selected as a combination of the temperature and the time. For example, in continuous annealing, the heat treating temperature may be 480 to 900° C. When the total content of nickel and cobalt is 2.7 g/m$^2$ or more, the heat treating temperature is preferably 650 to 850° C., more preferably 680 to 840° C. The soaking time (time in which the above heat treating temperature is held) in the heat treatment is preferably 10 seconds to 2 minutes, more preferably 10 seconds to 1.5 minutes, still more preferably 20 to 70 seconds. The heat treatment condition which ensures a heat quantity to sufficiently diffuse the iron in the steel sheet include the following example: when the total content is 4.5 g/m² or more, for example, the steel sheet is held at 700° C. or more and less than 750° C. for 1 minute or longer or at 750° C. to 840° C. for 20 seconds to 1.5 minutes. In batch annealing, the heat treating temperature is preferably 450 to 680° C., more preferably 500° C. to 650° C. The soaking time in batch annealing may be appropriately selected from the range of 1 to 24 hours depending on the total content of nickel and cobalt and the heat treating temperature, and is preferably 3 to 20 hours, more preferably 6 to 18 hours. The method of the thermal diffusion treatment may be any one of continuous annealing and batch annealing. The method is preferably continuous annealing from the viewpoint of high productivity using continuous steel strips, and is preferably batch annealing to expose a larger amount of iron to improve the battery characteristics. In particular, in standard production of continuous steel strips, a roll of steel strip is subjected to batch annealing. However, if the heat treating temperature is significantly high in batch annealing, cobalt undesirably diffuses from the nickel-cobalt-iron diffusion layer 12 formed on the surface of the rolled steel strip to the rear surface in contact therewith, unstabilizing the quality. In addition, the Ni concentration gradient $\Delta P_{Ni}$ in the nickel-cobalt-iron diffusion layer 12 is likely to be significantly reduced.

Thus, the surface-treated steel sheets 1 and 1a according to the present embodiment can be produced. In particular, in the present embodiment, a heat treatment is pertained on the steel sheet 11 having the nickel plating layer 13 and the cobalt plating layer 14 formed in sequence to mutually thermally diffuse iron constituting the steel sheet 11, nickel constituting the nickel plating layer 13, and nickel and cobalt constituting the cobalt plating layer 14, thereby forming the nickel-cobalt-iron diffusion layer 12. For example, compared to the case where a nickel-cobalt alloy plating layer is formed instead of the cobalt plating layer 14, the nickel content and the cobalt content in the resulting nickel-cobalt-iron diffusion layer 12 when the surface-treated steel sheet is produced using a continuous steel strip can be easily controlled to desired ranges, thereby ensuring higher productivity.

According to the production method according to the present embodiment, a nickel-cobalt-iron diffusion layer 12 having a Co concentration gradient $\Delta P_{Co}$ controlled to 33% by mass/0.1 μm or less can be suitably obtained by controlling the nickel content in the nickel plating layer 13, the total content of nickel and cobalt contained in the cobalt plating layer 14, and the heat treatment condition within the ranges above. Thus, according to the production method according to the present embodiment, when the resulting surface-treated steel sheets 1 and 1a according to the present embodiment are used as a battery case, a battery having a low internal resistance and high battery characteristics can be ensured while high corrosion resistance to the strongly alkaline electrolyte solution can be ensured and a reduction in battery characteristics after a lapse of time can also be suppressed. In short, the surface-treated steel sheets 1 and 1a according to the present embodiment can be suitably used as a battery case for batteries containing a strongly alkaline electrolyte solution. In particular, the surface-treated steel sheets 1 and 1a can be suitably used as a battery case for batteries including a mechanism for releasing the gases generated inside the batteries because even if trace amounts of gases are generated due to dissolving-out of cobalt and iron in the nickel-cobalt-iron diffusion layer 12 formed as the inner surface of the battery case, the generated gases can be appropriately released. Especially, in the production method of performing cobalt plating after nickel plating, followed by a heat treatment, Co close to the substrate is likely to readily diffuse, and Co in a region close to the surface is likely to remain, thus facilitating formation of a Co-concentrated region in a region close to the surface in the resulting Co distribution. For this reason, the half width $W_{Co}$ of the Co concentration in the nickel-cobalt-iron diffusion layer 12 is relatively small as 0.1 to 0.35 μm. Control of the Co concentration gradient within the specific range can further enhance the effect of reducing the internal resistance and the effect of improving corrosion resistance to the strongly alkaline electrolyte solution. As shown in FIG. 6(C) in which the scale of the abscissa in the graph of FIG. 6(A) is changed, the half width $W_{Co}$ of the Co concentration can be determined by calculating the difference between the depth position $D_{Co\_50\%\_ini}$ and the depth position $D_{Co\_50\%\_end}$ (i.e., |depth (μm) at depth $D_{Co\_50\%\_ini}$-depth (μm) at depth position $D_{Co\_50\%\_end}$|) where the concentration of Co at the depth position $D_{Co\_50\%\_ini}$ is 50% of the concentration of Co at the point $F_{Co\_MAX}$ which the concentration of Co is maximum.

Although the method of forming the nickel-cobalt-iron diffusion layer 12 by forming the nickel plating layer 13 and the cobalt plating layer 14 in sequence on the surface of the steel sheet 11, and then performing a heat treatment thereon to thermally diffuse iron, nickel, and cobalt contained in these layers has been illustrated above, such a method may be replaced by another method of forming the nickel-cobalt-iron diffusion layer 12, the method involving directly forming a nickel-cobalt alloy plating layer 14' alone on the surface of the steel sheet 11 without forming the nickel plating layer 13, and then performing a heat treatment thereon to cause thermal diffusion between the steel sheet 11 and the nickel-cobalt alloy plating layer 14'.

Hereinafter, a method of producing the surface-treated steel sheet 1 in which the nickel-cobalt-iron diffusion layer 12 is formed by forming the nickel-cobalt alloy plating layer 14' alone without forming the nickel plating layer 13, and then performing a heat treatment thereon will be described.

Although the nickel-cobalt alloy plating bath for forming the nickel-cobalt alloy plating layer 14' is not particularly limited, preferred is use of a plating bath having, as a base, a Watts bath containing nickel sulfate, nickel chloride, cobalt sulfate, and boric acid. The cobalt/nickel ratio in the nickel-cobalt alloy plating bath is in the range of preferably 0.05 to 1.0, more preferably, 0.1 to 0.7 in terms of a molar ratio cobalt/nickel. For example, if a plating bath having, as a base, a Watts bath containing nickel sulfate, nickel chloride, cobalt sulfate, and boric acid is used, the plating bath to be used can be prepared by suitably adjusting the contents of the respective components in the respective ranges, i.e., nickel sulfate in the range of 10 to 300 g/L, nickel chloride in the range of 20 to 60 g/L, cobalt sulfate in the range of 10 to 250 g/L, and boric acid in the range of 10 to 40 g/L such that the cobalt/nickel ratio falls within the range specified above. It is preferable that the nickel-cobalt alloy plating be performed under the conditions of a bath temperature of 40 to 80° C., a pH of 1.5 to 5.0, and a current density of 1 to 40 A/dm².

The total content of nickel and cobalt in the nickel-cobalt alloy plating layer 14' is preferably 11.5 g/m² or less, more preferably 10.0 g/m² or less, still more preferably 9.0 g/m² or less, particularly preferably 7.5 g/m² or less. Here, the content of nickel and cobalt in the nickel-cobalt alloy plating layer 14' can be determined by performing X-ray fluorescence analysis on the steel sheet 11 having the nickel-cobalt alloy plating layer 14' formed thereon, and measuring the total amount of nickel atoms and cobalt atoms deposited, which faun the nickel-cobalt alloy plating layer 14'. Although not particularly limited, the lower limit of the total content of nickel and cobalt in the nickel-cobalt alloy plating layer 14' is preferably 1.6 g/m$^2$ or more, more preferably 2.5 g/m$^2$ or more, still more preferably 3.0 g/m$^2$ or more, particularly preferably 3.5 g/m$^2$ or more. By controlling the total content of nickel and cobalt in the nickel-cobalt alloy plating layer 14' within such a range, iron constituting the steel sheet 11 can thermally diffuse successfully to the surface of the nickel-cobalt alloy plating layer 14' by a heat treatment when the heat treatment is performed on the steel sheet 11 having the nickel-cobalt alloy plating layer 14' formed thereon as described later. As a result, the nickel-cobalt-iron diffusion layer 12 can be more successfully formed.

Then, by performing the heat treatment on the steel sheet 11 having the nickel-cobalt alloy plating layer 14' formed thereon, iron in the steel sheet 11 and nickel and cobalt in the nickel-cobalt alloy plating layer 14' are mutually thermally diffused to form the nickel-cobalt-iron diffusion layer 12. Thereby, as shown in FIG. 3, the surface-treated steel sheet 1 including the nickel-cobalt-iron diffusion layer 12 formed on the steel sheet 11 is produced. To be noted, this production method, because of the nature thereof, is not suitable for production of the surface-treated steel sheet 1a shown in FIG. 7 or the like which is configured to further include the iron-nickel diffusion layer 15 between the steel sheet 11 and the nickel-cobalt-iron diffusion layer 12.

The heat treatment condition may be appropriately selected according to the total content of nickel and cobalt in the nickel-cobalt alloy plating layer 14'. The heat treating temperature is preferably 480 to 900° C., more preferably 500 to 800° C. and still more preferably 520 to 750° C. The soaking time (time in which the above heat treating temperature is held) in the heat treatment is preferably 3 seconds to 2 minutes, more preferably 10 seconds to 1.5 minutes, and still more preferably 20 to 60 seconds. Although the method of the thermal diffusion treatment may be any one of continuous annealing and batch annealing, preferred is continuous annealing, in which the heat treating temperature and the heat treatment time can easily be adjusted in the above ranges.

In the production method above, the Co concentration gradient of the resulting nickel-cobalt-iron diffusion layer 12 can be controlled to 33%/0.1 μm or less by controlling the total content of nickel and cobalt in the nickel-cobalt alloy plating layer 14 and the heat treatment condition within the ranges above. Thus, when the resulting surface-treated steel sheet 1 according to the present embodiment is used as a battery case, a battery having a low internal resistance and high battery characteristics can be ensured while high corrosion resistance to the strongly alkaline electrolyte solution can be ensured and a reduction in battery characteristics after a lapse of time can also be suppressed. In short, the surface-treated steel sheet 1 according to the present embodiment can be suitably used as a battery case for batteries containing a strongly alkaline electrolyte solution. In particular, the surface-treated steel sheet 1 can be suitably used as a battery case for batteries including a mechanism for releasing the gases generated inside the batteries because even if trace amounts of gases are generated due to dissolving-out of cobalt and iron in the nickel-cobalt-iron diffusion layer 12 formed as the inner surface of the battery case, the generated gases can be appropriately released.

Alternatively, another method may be used, in which the nickel plating layer 13 is formed in the same manner as in above, the steel sheet 11 having the nickel plating layer 13 formed thereon is subjected to nickel-cobalt alloy plating in the same manner as in above, and then a heat treatment in the same manner as in above to faun a nickel-cobalt alloy plating layer 14".

Although the nickel-cobalt alloy plating bath for forming the nickel-cobalt alloy plating layer 14" is not particularly limited, preferred is use of a plating bath having, as a base, a Watts bath containing nickel sulfate, nickel chloride, cobalt sulfate, and boric acid. The cobalt/nickel ratio in the nickel-cobalt alloy plating bath is in the range of preferably 0.05 to 1.0, more preferably 0.1 to 0.7 in terms of a molar ratio cobalt/nickel. For example, if a plating bath having, as a base, a Watts bath containing nickel sulfate, nickel chloride, cobalt sulfate, and boric acid is used, the plating bath to be used can be prepared by suitably adjusting the contents of the respective components in the respective ranges, i.e., nickel sulfate in the range of 10 to 300 g/L, nickel chloride in the range of 20 to 60 g/L, cobalt sulfate in the range of 10 to 250 g/L, and boric acid in the range of 10 to 40 g/L such that the cobalt/nickel ratio falls within the above range. It is preferable that the nickel-cobalt alloy plating be performed under the conditions of a bath temperature of 40 to 80° C., a pH of 1.5 to 5.0, and a current density of 1 to 40 A/dm$^2$.

The total content of nickel and cobalt in the nickel-cobalt alloy plating layer 14" may be 7.5 g/m$^2$ or less, and is preferably 4.0 g/m$^2$ or less, more preferably 3.0 g/m$^2$ or less. Here, the nickel and cobalt contents in the nickel-cobalt alloy plating layer 14" can be determined by performing fluorescence X-ray analysis on the steel sheet 11 having the nickel plating layer 13 and the nickel-cobalt alloy plating layer 14" formed thereon to measure the total amount of nickel atoms and cobalt atoms deposited, which form the nickel plating layer 13 and the nickel-cobalt alloy plating layer 14", and subtracting the nickel content in the nickel plating layer 13 above from the total amount of nickel atoms and cobalt atoms deposited (or subtracting the amount of nickel deposited when the nickel plating layer 13 is formed). Although not particularly limited, the lower limit of the total content of nickel and cobalt in the nickel-cobalt alloy plating layer 14" is preferably 0.4 g/m$^2$ or more, more preferably 0.8 g/m$^2$ or more, still more preferably 1.2 g/m$^2$ or more, particularly preferably 1.6 g/m$^2$ or more. By controlling the total content of nickel and cobalt in the nickel-cobalt alloy plating layer 14" within such a range, iron constituting the steel sheet 11 can thermally diffuse successfully through the nickel plating layer 13 to the surface of the nickel-cobalt alloy plating layer 14" by a heat treatment when the heat treatment is performed on the steel sheet 11 having the nickel plating layer 13 and the nickel-cobalt alloy plating layer 14" formed thereon as described later. As a result, the nickel-cobalt-iron diffusion layer 12 can be more successfully formed.

The cobalt content in the nickel-cobalt alloy plating layer 14" is preferably 0.2 g/m$^2$ or more. The cobalt content is more preferably 0.5 g/m$^2$ or more, still more preferably 0.7 g/m$^2$ or more to further improve the battery characteristics of the resulting battery. Although the upper limit of the cobalt content is not particularly limited unless control of the content thereof in the surface layer within a predetermined range is inhibited, an excessive cobalt content might obstruct exposure of iron. Thus, the upper limit is preferably 5.0 g/m$^2$ or less, more preferably 3.0 g/m$^2$ or less, still more preferably 2.0 g/m² or less. The cobalt content can be determined by performing fluorescence X-ray analysis on the steel sheet 11 having the nickel plating layer 13 and the nickel-cobalt alloy plating layer 14" formed thereon to measure the amount of cobalt atoms deposited, which form the nickel-cobalt alloy plating layer 14". By controlling the cobalt content in the nickel-cobalt alloy plating layer 14" within the above range, the resulting battery can have further improved battery characteristics when the surface-treated steel sheet 1 is used as a battery case.

Next, by performing a heat treatment on the steel sheet 11 having the nickel plating layer 13 and the nickel-cobalt alloy plating layer 14" formed thereon, iron constituting the steel sheet 11, nickel constituting the nickel plating layer 13, and nickel and cobalt constituting the nickel-cobalt alloy plating layer 14" are mutually thermally diffused to form the nickel-cobalt-iron diffusion layer 12. Thereby, as shown in FIG. 3, the surface-treated steel sheet 1 including the nickel-cobalt-iron diffusion layer 12 formed on the steel sheet 11 is produced. Alternatively, the surface-treated steel sheet 1a including the iron-nickel diffusion layer 15 between the steel sheet 11 and the nickel-cobalt-iron diffusion layer 12 is obtained, as shown in FIG. 7, depending on the nickel content in the nickel plating layer 13, the total content of nickel and cobalt contained in the cobalt plating layer 14", and the condition for the heat treatment.

The heat treatment condition may be appropriately selected depending on the nickel content in the nickel plating layer 13 and the total content of nickel and cobalt contained in the nickel-cobalt alloy plating layer 14". The heat treating temperature may be 480 to 900° C., and is preferably 500 to 800° C., more preferably 520 to 750° C. The soaking time (time in which the above heat treating temperature is held) in the heat treatment is preferably 3 seconds to 2 minutes, more preferably 10 seconds to 1.5 minutes, and still more preferably 20 to 60 seconds. Although the method of the thermal diffusion treatment may be any one of continuous annealing and batch annealing, preferred is continuous annealing, in which the heat treating temperature and the heat treatment time can easily be adjusted in the above ranges. If the content of nickel and cobalt is 11.5 g/m² or less, continuous annealing at a heat treating temperature of 600 to 900° C. is more preferred, and continuous annealing at a heat treating temperature of 700 to 830° C. is still more preferred to more stably expose iron. If the content of nickel and cobalt is 5.4 g/m² or less, continuous annealing at a heat treating temperature of 480° C. or more and less than 600° C. may be used.

EXAMPLES

Hereinafter, the present invention will be described more specifically by way of Examples, but the present invention is not limited to these Examples.

The definitions and the evaluation methods of physical properties will be shown below.

<Ni Content and Co Content>

By performing a measurement on the surface of the surface-treated steel sheet with an X-ray fluorescence analyzer (available from Rigaku Corp., ZSX100e), the Ni content and the Co content in the nickel-cobalt-iron diffusion layer (the total content of Ni and the total content of Co contained in the nickel-cobalt-iron diffusion layer and the iron-nickel diffusion layer in the case where the iron-nickel diffusion layer was formed between the steel sheet and the nickel-cobalt-iron diffusion layer) were measured.

<Co Concentration Gradient $\Delta P_{Co}$, Ni Concentration Gradient $\Delta P_{Ni}$, Ni Concentration $P_{Ni}(D_{Ni\_0.5\%})$, Co Concentration $P_{Co}(D_{Ni\_0.5\%})$, Fe Concentration $P_{Fe}(D_{Ni\_0.5\%})$>

According to the method described above, for the surface-treated steel sheet, the intensities for Ni, Co, and Fe were consecutively measured in the depth direction from the surface of the nickel-cobalt-iron diffusion layer toward the steel sheet by radio frequency glow discharge optical emission spectrometry. Based on the resulting intensities for Ni, Co, and Fe, the concentration of Ni, the concentration of Co, and the concentration of Fe were determined to determine the Co concentration gradient $\Delta P_{Co}$, the Ni concentration gradient $\Delta P_{Ni}$, the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$. Based on the determined Co concentration $P_{Co}(D_{Ni\_0.5\%})$ and Fe concentration $P_{Fe}(D_{Ni\_0.5\%})$, the ratio $R_{Fe/Co}(P_{Fe}(D_{Ni\_0.5\%})/P_{Co}(D_{Ni\_0.5\%}))$ of the Fe concentration $P_{Fe}(D_{Ni\_0.5\%})$ to the Co concentration $P_{Co}(D_{Ni\_0.5\%})$ was also determined. The measurement conditions for radio frequency glow discharge optical emission spectrometry were set as follows.

Measuring instrument: a Marcus-type radio frequency glow discharge optical emission spectrometer (HORIBA, Ltd., model number: GD-Profiler 2)

Voltage (H.V.) of a photomultiplier channel: 785 V for Fe; 630 V for Ni; and 720 V for Co Anode diameter: $\phi 4$ mm Gas kind: Ar Fetching interval: 0.05 sec Gas pressure: 600 Pa Output: 35 W <Corrosion Current Density>

The surface-treated steel sheet was cut to prepare a strip test piece of 20 mm in width and 40 mm in length. A $\phi 6$ mm measurement area was set for the test piece. The test piece was immersed in a 10M potassium hydroxide aqueous solution adjusted to a temperature of 25° C.; and the measurement was performed by using an electrochemical measuring system (available from Hokuto Denko Corp., model number: HZ-5000) with a silver/silver chloride electrode as a reference electrode and platinum as a counter electrode, and sweeping the potential from −800 mV to 800 mV at a rate of 50 mV/min. Then, based on the measurement result, the current density at the time point when the potential was 100 mV was obtained as a corrosion current density. In the evaluation of the corrosion current density, it was determined that the surface-treated steel sheet having a corrosion current density of 0.025 mA/cm² or less, preferably 0.015 mA/cm² or less has high dissolving-out resistance.

<Contact Resistance Value>

The surface-treated steel sheet was cut according to JIS Z2241: 2011 "Method of tensile test for metallic materials" to thereby prepare No. 13B test pieces. Then, one of the test pieces was measured using an electric contact simulator (available from Yamazaki-seiki Co., Ltd., model number: CRS-1) under the condition of a contact load of 100 gf, thereby obtaining a first contact resistance value of the test piece. Then, the test piece after the first contact resistance value was measured was subjected to a tensile test using a desktop precision universal testing machine (available from Shimadzu Corp., model number: AGS-X) under the condition of a tensile rate of 20%, and then the test piece after the tensile test was subjected to the same measurement, thereby obtaining a second contact resistance value. Further, the test piece after the second contact resistance value was measured was immersed in a 10M potassium hydroxide aqueous solution under the condition of 60° C. for 20 days, thereafter, pulled up from the potassium hydroxide aqueous solution, and then subjected again to the same measurement, thereby obtaining a third contact resistance value of the test piece. Then, the found contact resistance values are shown in Table 2 described later. In Table 2, the first contact resistance value is represented as "Before tension", the second contact resistance value as "Before lapse of time"; and the third contact resistance value as "After lapse of time". Further in Table 2, the difference between the second contact resistance value and the third contact resistance value is represented as "Change amount before and after lapse of time". In the evaluation of the contact resistance value, it was determined that the surface-treated steel sheet can suppress degradation of the battery characteristics after a lapse of time if the measured value "after the lapse of time" is 12 mΩ or less, and was further determined that the degradation of the battery characteristics can be further suppressed if the measured value is 10 mΩ or less, particularly 8 mΩ or less.

<Discoloration in Constant Temperature and Humidity Test>

Using a thermo-hygrostat (product name "LHL-113", available from ESPEC Corp.), the surface-treated steel sheet was subjected to a constant temperature and humidity test under a condition at a temperature of 55° C. and a humidity of 85% for 400 hours. The surface of the nickel-cobalt-iron diffusion layer of the surface-treated steel sheet was measured with a spectrocolorimeter (product name "CM-5", available from KONICA MINOLTA JAPAN, INC.) before and after the constant temperature and humidity test to determine the discoloration amount (ΔL*) of the surface of the nickel-cobalt-iron diffusion layer of the surface-treated steel sheet before and after the constant temperature and humidity test. Measurement was performed with the spectrocolorimeter under the measurement conditions: the main light source: D65, the field: 10°, the measurement method: reflectance mode, specular component treatment: SCE, and the measurement diameter: ϕ8 mm. It can be determined that a smaller discoloration amount (ΔL*) before and after the constant temperature and humidity test indicates less discoloration after a lapse of time and larger suppression in a reduction of product quality after the lapse of time. The discoloration using the constant temperature and humidity test was performed in Examples 3 and 4 and Comparative Examples 4, 6, and 12.

Example 1

As a metal sheet, a steel sheet obtained by annealing a TM rolled sheet (thickness: 0.25 mm) of a low-carbon aluminum-killed steel having the following chemical composition was prepared.

C: 0.04% by weight, Mn: 0.21% by weight, Si: 0.02% by weight, P: 0.012% by weight, S: 0.009% by weight, Al: 0.061% by weight, N: 0.0036% by weight, and the balance: Fe and inevitable impurities The prepared steel sheet was subjected to alkaline electrolytic degreasing and acid pickling by immersion in sulfuric acid, and thereafter nickel plated under the following condition, thereby forming a nickel plating layer having an amount of Ni deposited of 3.81 g/m².

<Nickel Plating>
Bath composition: 250 g/L of nickel sulfate, 45 g/L of nickel chloride, 30 g/L of boric acid
pH: 3.6 to 4.6
Bath temperature: 60° C.
Current density: 20 A/dm²

Then, the steel sheet having the nickel plating layer formed thereon was subjected to cobalt plating under the following condition, thereby forming a cobalt plating layer on the nickel plating layer. The cobalt plating layer was formed under a condition such that the total amount of nickel and cobalt (also including the nickel amount in the underlying nickel plating layer) was as shown in Tables 1 and 2.

<Cobalt Plating>
Plating bath composition: 250 g/L of cobalt sulfate, 90 g/L of cobalt chloride, 20 g/L of sodium chloride, 30 g/L of boric acid
pH: 3.5 to 5.0
Bath temperature: 60° C.
Current density: 10 A/dm²

Then, the steel sheet having the nickel plating layer and the cobalt plating layer formed thereon was subjected to continuous annealing (heat treatment) in which the heat treating temperature was held at 800° C. for 40 seconds, thereby forming a nickel-cobalt-iron diffusion layer. Thus, a surface-treated steel sheet was obtained. The resulting surface-treated steel sheet was evaluated for the Ni amount, the Co amount, the Co concentration gradient $\Delta P_{Co}$, the Ni concentration $P_{Ni}(D_{Ni\_0.5\%})$, the Co concentration $P_{Co}(D_{Ni\_0.5\%})$, the Fe concentration $P_{Fe}(D_{Ni\_0.5\%})$, the corrosion current density, and the contact resistance value according to the methods above. The results are shown in Tables 1 and 2 and FIGS. 5(B), 6(A), and 6(B). FIGS. 5(B), 6(A), and 6(B) are graphs showing the results from the measurement of the surface-treated steel sheet by radio frequency glow discharge optical emission spectrometry to determine the Co concentration gradient $\Delta P_{Co}$, the Ni concentration gradient $\Delta P_{Ni}$, the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$.

Examples 2 to 5

Figure 8A:
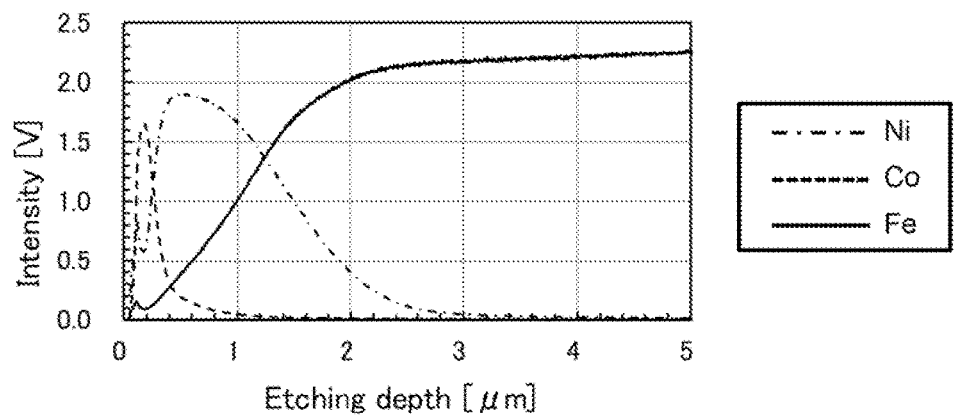
FIGS. 8(A), 8(B) and 8(C) show graphs showing the results obtained by measuring the surface-treated steel sheet in Example 2 by radio frequency glow discharge optical emission spectrometer.
Figure 8B:
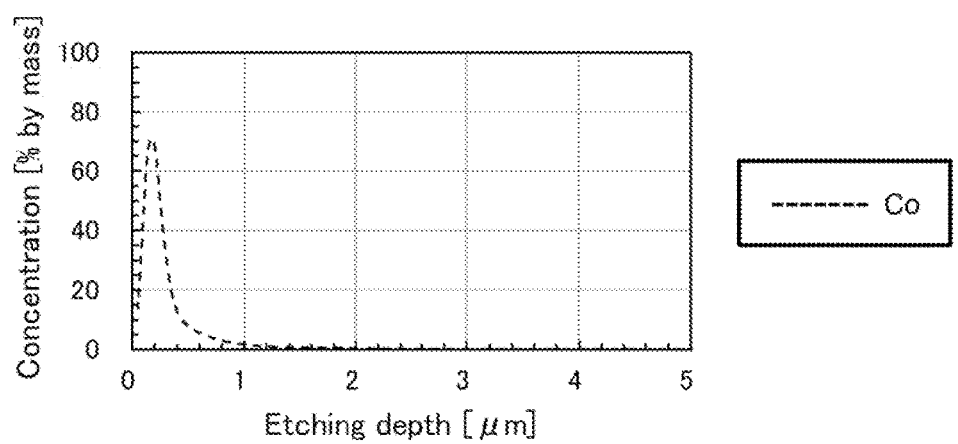
Figure 8C:
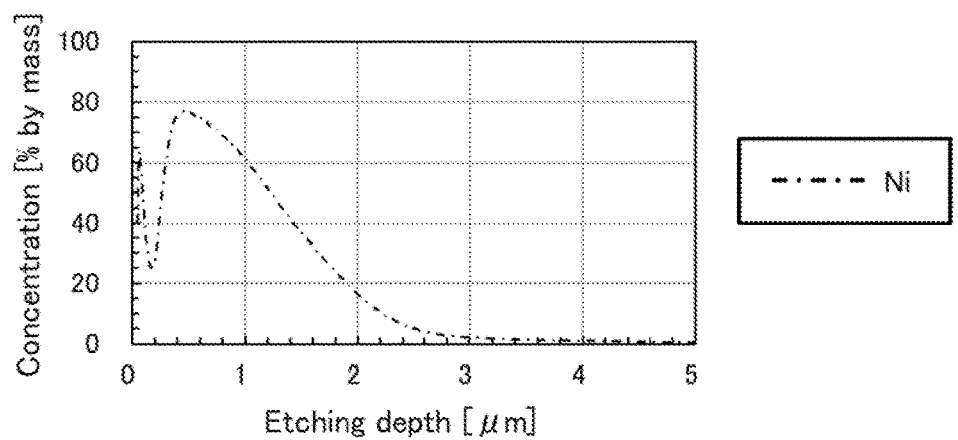

Surface-treated steel sheets were produced in the same manner as in Example 1 except that the amount of nickel deposited in formation of the nickel plating layer, the condition for forming the cobalt plating layer, and the heat treating temperature and the heat treatment method when the heat treatment was performed were varied as in Tables 1 and 2, and were evaluated in the same manner as in Example 1. The cobalt plating layers were formed under a condition such that the total amount of nickel and cobalt (also including the nickel amount in the underlying nickel plating layer) was as shown in Tables 1 and 2. The results are shown in Tables 1 and 2. For Example 2, the graphs in FIGS. 8 (A) to 8(C) show the results from the measurement of the surface-treated steel sheet by radio frequency glow discharge optical emission spectrometry to determine the Co concentration gradient $\Delta P_{Co}$, the Ni concentration gradient $\Delta P_{Ni}$, the Ni concentration $P_{Ni}(D_{Ni\_0.5\%})$, the Co concentration $P_{Co}(D_{Ni\_0.5\%})$, and the Fe concentration $P_{Fe}(D_{Ni\_0.5\%})$.

Example 6

The surface-treated steel sheet was produced in the same manner as in Example 1 except that a nickel-cobalt alloy plating layer, rather than the cobalt plating layer, was formed on the nickel plating layer and the heat treating temperature and the heat treatment method for the heat treatment were varied as shown in Tables 1 and 2, and was evaluated in the same manner as in Example 1. The results are shown in Tables 1 and 2. The nickel-cobalt alloy plating layer was formed under the following condition, and nickel-cobalt alloy plating was performed such that the total amount of nickel and cobalt (also including the nickel amount in the underlying nickel plating layer) was as shown in Tables 1 and 2.

<Nickel-Cobalt Alloy Plating>

Plating bath composition: containing nickel sulfate, nickel chloride, cobalt sulfate, cobalt chloride, and boric acid in a molar ratio of cobalt/nickel of 0.30
pH: 3.6 to 4.6
Bath temperature: 60° C.
Current density: 20 A/dm$^2$ Comparative Examples 1 to 3

Surface-treated steel sheets were produced in the same manner as in Example 1 except that the amount of nickel deposited in formation of the nickel plating layer was varied as shown in Table 1, the cobalt plating layer was not formed, and the heat treating temperature and the heat treatment method for the heat treatment were varied as shown in Tables 1 and 2, and were evaluated in the same manner as in Example 1. The results are shown in Table 1. In Comparative Examples 1 to 3, the cobalt plating layer was not formed. For this reason, cobalt is not detected in fluorescence X-ray analysis, but cobalt might be detected in the results of measurement by radio frequency glow discharge optical emission spectrometry because cobalt has a light emission wavelength close to those of nickel and iron in some cases. However, it is apparent that the surface-treated steel sheets in Comparative Examples 1 to 3 did not contain cobalt because the cobalt plating layer was not formed. Moreover, the Co concentration $P_{Co}(D_{Ni\_0.5\%})$ calculated based on the intensity for Co in the results of measurement was very small (about 2% by mass or less) in the calculation of the concentrations of the elements based on the intensity ratio obtained by radio frequency glow discharge optical emission spectrometry. Thus, it was determined that cobalt was not contained, and the Ni concentration $P_{Ni}(D_{Ni\_0.5\%})$ and the Fe concentration $P_{Fe}(D_{Ni\_0.5\%})$ were determined based on the ratio of the intensity for Ni and that of the intensity for Fe of 100% of the total of the intensities for Ni and for Fe. In Comparative Examples 1 to 3, the ratio $R_{Fe/Co}$ was also not calculated.

Comparative Example 4

A surface-treated steel sheet was produced in the same manner as in Example 1 except that the cobalt plating layer was directly formed on the steel sheet without forming the nickel plating layer, the condition for forming the cobalt plating layer were varied as shown in Table 1, and the heat treatment was not performed, and was evaluated in the same manner as in Example 1. The cobalt plating layer was formed under a condition such that the total amount of nickel and cobalt (also including the nickel amount in the underlying nickel plating layer) was as shown in Table 1. The results are shown in Table 1. For Comparative Example 4, the contact resistance value was not measured because the corrosion current density was clearly large, and it was verified that use of the surface-treated steel sheet in a battery case would lead to a low corrosion resistance to the electrolyte solution.

Comparative Examples 5 to 12

Surface-treated steel sheets were produced in the same manner as in Example 1 except that the amount of nickel deposited in formation of the nickel plating layer, the condition for forming the cobalt plating layer, and the heat treating temperature and the heat treatment method for the heat treatment were varied as shown in Table 1, and were evaluated in the same manner as in Example 1. The cobalt plating layer was formed under a condition such that the total amount of nickel and cobalt (also including the nickel amount in the underlying nickel plating layer) was as shown in Table 1. The results are shown in Table 1. For Comparative Examples 5 to 12, the contact resistance value was not measured because the corrosion current density was clearly large, and it was verified that use of the surface-treated steel sheet in a battery case would lead to a low corrosion resistance to the electrolyte solution.

TABLE 1

| | Production conditions | | | | Surface-treated steel sheet | | | |
|---|---|---|---|---|---|---|---|---|
| | Amount of Ni | Heat treatment conditions | | | | | | Ni |
| | plating layer deposited [g/m$^2$] | Heat treatment method | Heat treating temperature [° C.] | Heat treatment time [sec] | Ni content + Co content [g/m$^2$] | Ni content [g/m$^2$] | Co content [g/m$^2$] | concentration $P_{Ni}(D_{Ni\_0.5\%})$ [% by mass] |
| Example 1 | 3.81 | Continuous annealing | 800 | 40 | 4.88 | 3.81 | 1.07 | 23.5 |
| Example 2 | 8.20 | Continuous annealing | 800 | 40 | 9.26 | 8.20 | 1.07 | 37.25 |
| Example 3 | 11.58 | Continuous annealing | 800 | 40 | 12.64 | 11.58 | 1.07 | 49.75 |
| Example 4 | 5.74 | Batch annealing | 600 | 28800 | 6.69 | 5.74 | 0.95 | 28.74 |
| Example 5 | 8.80 | Batch annealing | 700 | 3600 | 10.7 | 8.80 | 1.90 | 33.18 |
| Example 6 | 4.45 | Batch annealing | 600 | 28800 | 6.31 | 5.37 | 0.94 | 13.64 |
| Comparative Example 1 | 2.71 | Continuous annealing | 700 | 40 | 2.71 | 2.71 | 0 | 34.67 |
| Comparative Example 2 | 4.42 | Continuous annealing | 700 | 40 | 4.42 | 4.42 | 0 | 64.94 |
| Comparative Example 3 | 4.42 | Continuous annealing | 730 | 40 | 4.42 | 4.42 | 0 | 36.67 |
| Comparative Example 4 | — | — | — | — | — | 0 | 51.79 | — |

TABLE 1-continued

| | | | | | | | | |
|---|---|---|---|---|---|---|---|---|
| Comparative Example 5 | 3.81 | Continuous annealing | 700 | 40 | 4.88 | 3.81 | 1.07 | 43.59 |
| Comparative Example 6 | 8.20 | Continuous annealing | 700 | 40 | 9.26 | 8.20 | 1.07 | 61.88 |
| Comparative Example 7 | 11.58 | Continuous annealing | 700 | 40 | 12.64 | 11.58 | 1.07 | 69.55 |
| Comparative Example 8 | 3.81 | Continuous annealing | 600 | 40 | 4.88 | 3.81 | 1.07 | 40.27 |
| Comparative Example 9 | 8.20 | Continuous annealing | 600 | 40 | 9.26 | 8.20 | 1.07 | 55.42 |
| Comparative Example 10 | 11.58 | Continuous annealing | 600 | 40 | 12.64 | 11.58 | 1.07 | 64.34 |
| Comparative Example 11 | 5.74 | — | — | — | 6.69 | 5.74 | 0.95 | 0.57 |
| Comparative Example 12 | 5.74 | Continuous annealing | 700 | 40 | 6.69 | 5.74 | 0.95 | 65.73 |

| | Surface-treated steel sheet | | | | |
|---|---|---|---|---|---|
| | Co concentration $P_{Co}(D_{Ni\_0.5\%})$ [% by mass] | Fe concentration $P_{Fe}(D_{Ni\_0.5\%})$ [% by mass] | Ratio $R_{Fe/Co}$ | Co concentration gradient $\Delta P_{Co}$ [% by mass/ 0.1 μm] | Evaluation Corrosion current density [mA/cm$^2$] |
| Example 1 | 15.14 | 61.37 | 4.05 | 7.8 | 0.02422 |
| Example 2 | 17.36 | 45.38 | 2.61 | 23.5 | 0.01583 |
| Example 3 | 20.06 | 30.19 | 1.51 | 10.3 | 0.00619 |
| Example 4 | 9.77 | 61.48 | 6.29 | 3.3 | 0.00733 |
| Example 5 | 13.40 | 53.43 | 3.99 | 2.3 | 0.01036 |
| Example 6 | 5.83 | 80.53 | 13.81 | 1.2 | 0.00416 |
| Comparative Example 1 | — | 65.33 | — | 0.0 | 0.00383 |
| Comparative Example 2 | — | 35.06 | — | 0.0 | 0.00241 |
| Comparative Example 3 | — | 63.33 | — | 0.0 | 0.00399 |
| Comparative Example 4 | 100.00 | — | — | — | 0.06000 |
| Comparative Example 5 | 13.34 | 43.07 | 3.23 | 40.1 | 0.05397 |
| Comparative Example 6 | 21.33 | 16.78 | 0.79 | 42.9 | 0.05081 |
| Comparative Example 7 | 23.87 | 6.58 | 0.28 | 39.4 | 0.04259 |
| Comparative Example 8 | 21.53 | 38.21 | 1.77 | 41.0 | 0.06813 |
| Comparative Example 9 | 27.79 | 16.78 | 0.60 | 40.5 | 0.06474 |
| Comparative Example 10 | 25.58 | 10.08 | 0.39 | 39.7 | 0.05765 |
| Comparative Example 11 | 99.23 | 0.20 | 0.001999 | 45.7 | 0.04076 |
| Comparative Example 12 | 19.91 | 14.36 | 0.72 | 40.2 | 0.02904 |

TABLE 2

| | Production conditions | | | | Surface-treated steel sheet | | | |
|---|---|---|---|---|---|---|---|---|
| | Amount of Ni plating layer deposited [g/m$^2$] | Heat treatment conditions | | | Ni content + Co content [g/m$^2$] | Ni content [g/m$^2$] | Co content [g/m$^2$] | Ni concentration $P_{Ni}(D_{Ni\_0.5\%})$ [% by mass] |
| | | Heat treatment method | Heat treating temperature [° C.] | Heat treatment time [sec] | | | | |
| Example 1 | 3.81 | Continuous annealing | 800 | 40 | 4.88 | 3.81 | 1.07 | 23.5 |
| Example 2 | 8.20 | Continuous annealing | 800 | 40 | 9.26 | 8.20 | 1.07 | 37.25 |
| Example 3 | 11.58 | Continuous annealing | 800 | 40 | 12.64 | 11.58 | 1.07 | 49.75 |
| Example 4 | 5.74 | Batch annealing | 600 | 28800 | 6.69 | 5.74 | 0.95 | 28.74 |
| Example 5 | 8.80 | Batch annealing | 700 | 3600 | 10.7 | 8.80 | 1.90 | 33.18 |

TABLE 2-continued

| | | | | | | | | |
|---|---|---|---|---|---|---|---|---|
| Example 6 | 4.45 | Batch annealing | 600 | 28800 | 6.31 | 5.37 | 0.94 | 13.64 |
| Comparative Example 1 | 2.71 | Continuous annealing | 700 | 40 | 2.71 | 2.71 | 0 | 34.67 |
| Comparative Example 2 | 4.42 | Continuous annealing | 700 | 40 | 4.42 | 4.42 | 0 | 64.94 |
| Comparative Example 3 | 4.42 | Continuous annealing | 730 | 40 | 4.42 | 4.42 | 0 | 36.67 |

| | Surface-treated steel sheet | | | | Evaluation | | | |
|---|---|---|---|---|---|---|---|---|
| | | | | | | Contact resistance | | |
| | Co concentration $P_{Co}(D_{Ni\_0.5\%})$ [% by mass] | Fe concentration $P_{Fe}(D_{Ni\_0.5\%})$ [% by mass] | Ratio $R_{Fe/Co}$ | Co concentration gradient $\Delta P_{Co}$ [% by mass/ 0.1 µm] | Before tension [mΩ] | Before lapse of time [mΩ] | After lapse of time [mΩ] | Change amount before and after lapse of time [mΩ] |
| Example 1 | 15.14 | 61.37 | 4.05 | 7.8 | 2.30 | 2.60 | 4.65 | 2.05 |
| Example 2 | 17.36 | 45.38 | 2.61 | 23.5 | 2.20 | 2.50 | 4.80 | 2.30 |
| Example 3 | 20.06 | 30.19 | 1.51 | 10.3 | 2.45 | 2.75 | 4.95 | 2.20 |
| Example 4 | 9.77 | 61.48 | 6.29 | 3.3 | 2.80 | 3.10 | 5.24 | 2.14 |
| Example 5 | 13.40 | 53.43 | 3.99 | 2.3 | 2.80 | 3.10 | 5.25 | 2.15 |
| Example 6 | 5.83 | 80.53 | 13.81 | 1.2 | 2.08 | 2.36 | 679.00 | 676.64 |
| Comparative Example 1 | — | 65.33 | — | 0.0 | 1.94 | 1.90 | 791.50 | 789.60 |
| Comparative Example 2 | — | 35.06 | — | 0.0 | 2.04 | 2.24 | 106.50 | 104.26 |
| Comparative Example 3 | — | 63.33 | — | 0.0 | 2.45 | 2.75 | 5.15 | 2.40 |

As shown in Tables 1 and 2, it was verified that in the surface-treated steel sheets including a nickel-cobalt-iron diffusion layer in which the Co concentration gradient $\Delta P_{Co}$ from the depth position $D_{Co\_MAX}$ to the depth position $D_{Ni\_0.5\%}$ was controlled to 33% by mass/0.1 µm or less, the corrosion current density was 0.03 mA/cm² or less, preferably 0.002 mA/cm² or less, and the contact resistance value after a lapse of time was 8 mΩ or less; thus, high dissolving-out resistance was ensured, and degradation of the battery characteristics after a lapse of time was suppressed (Examples 1 to 6). For Examples 1 to 6, measurement of the Ni concentration gradient $\Delta P_{Ni}$ from the depth position $D_{Ni\_MAX}$ and the depth position $D_{Ni\_0.5\%}$ revealed that the Ni concentration gradient $\Delta P_{Ni}$ was 36.6% by mass/µm in Example 1, 39.8% by mass/µm in in Example 2, 32.5% by mass/µm in Example 3, 21.4% by mass/µm in Example 4, 13.6% by mass/µm in Example 5, and 29.1% by mass/µm in Example 6. For Examples 1 to 6, the half width $W_{Co}$ of the Co concentration was 0.23 µm in Example 1, 0.19 µm in Example 2, 0.20 µm in Example 3, 0.25 µm in Example 4, 0.53 µm in Example 5, and 0.47 µm in Example 6.

In contrast, as shown in Tables 1 and 2, the cases where the nickel-cobalt-iron diffusion layer was not formed as the outermost layer and where Co concentration gradient $\Delta P_{Co}$ exceeded 33% by mass/0.1 µm resulted in low dissolving-out resistance due to a high corrosion current density or reduced battery characteristics after a lapse of time due to a high contact resistance value after a lapse of time (Comparative Examples 1 to 12).

The discoloration amount (ΔL*) determined in the constant temperature and humidity test was −0.3 in Example 3, −0.6 in Example 4, −3.0 in Comparative Example 4, −1.4 in Comparative Example 6, and −1.1 in Comparative Example 12. Examples 3 and 4 exhibited a significant suppression in discoloration amount (ΔL*). These results suggest that in Examples 1, 2, 5, and 6 other than Examples 3 and 4, the discoloration amount (ΔL*) determined in the constant temperature and humidity test was significantly reduced as in Examples 3 and 4.

REFERENCE SIGNS LIST 1, 1a Surface-treated steel sheet
11 Steel sheet
12 Nickel-cobalt-iron diffusion layer
13 Nickel plating layer
14 Cobalt plating layer
15 Iron-nickel diffusion layer

The invention claimed is:
1. A surface-treated steel sheet, comprising:
a steel sheet; and
a nickel-cobalt-iron diffusion layer formed on the steel sheet as an outermost layer, wherein when intensities for Ni, Co, and Fe are consecutively measured from a surface of the nickel-cobalt-iron diffusion layer in a depth direction by radio frequency glow discharge optical emission spectrometry, and a concentration of Ni, a concentration of Co, and a concentration of Fe at each depth position of the nickel-cobalt-iron diffusion layer are determined based on the intensities for Ni, Co, and Fe,
a Co concentration gradient $\Delta P_{Co}$ ranging from a depth position $D_{Co\_MAX}$ to a depth position $D_{Co\_15\%}$ is 7.8% by mass/0.1 µm or more and 33% by mass/0.1 µm or less, where a depth position at which the concentration of Co is maximum is defined as $D_{Co\_MAX}$ and a depth position which is located closer to the steel sheet than the depth position $D_{Co\_MAX}$ and at which the concentration of Co is 15% of a maximum value is defined as $D_{Co\_15\%}$,
a Ni content in the nickel-cobalt-iron diffusion layer is 8.5 g/m² or less, a total content of Ni and Co contained in the nickel-cobalt-iron diffusion layer is 10.0 g/m² or less, and an Fe concentration $P_{Fe}(D_{Ni\_0.5\%})$ at a depth position $D_{Ni\_0.5\%}$ is 20% by mass or more, where among depth positions at which an intensity for Ni in the nickel-cobalt-iron diffusion layer is 0.5% of a maximum value, a depth position located closest to the surface is defined as $D_{Ni\_0.5\%}$.

2. The surface-treated steel sheet according to claim 1, wherein when the intensities for Ni, Co, and Fe are consecutively measured from the surface of the nickel-cobalt-iron diffusion layer in the depth direction by radio frequency glow discharge optical emission spectrometry, and the concentration of Ni, the concentration of Co, and the concentration of Fe at each depth position of the nickel-cobalt-iron diffusion layer are determined based on the intensities for Ni, Co, and Fe, a Ni concentration gradient $\Delta P_{Ni}$ ranging from a depth position $D_{Ni\_MAX}$ to a depth position $D_{Ni\_15\%}$ is 15% by mass/μm or more, where a depth position at which the concentration of Ni is maximum is defined as $D_{Ni\_MAX}$, and a depth position which is located closer to the steel sheet than the depth position $D_{Ni\_MAX}$ and at which the concentration of Ni is 15% of a maximum value is defined as $D_{Ni\_15\%}$.

3. The surface-treated steel sheet according to claim 1, wherein when the intensities for Ni, Co, and Fe are consecutively measured from the surface of the nickel-cobalt-iron diffusion layer in the depth direction by radio frequency glow discharge optical emission spectrometry, and the concentration of Ni, the concentration of Co, and the concentration of Fe at each depth position of the nickel-cobalt-iron diffusion layer are determined based on the intensities for Ni, Co, and Fe, a Ni concentration $P_{Ni}(D_{Ni\_0.5\%})$ at a depth position $D_{Ni\_0.5\%}$ is 70% by mass or less, and a Co concentration $P_{Co}(D_{Ni\_0.5\%})$ at the depth position $D_{Ni\_0.5\%}$ is 5% by mass or more, where among depth positions at which the intensity for Ni in the nickel-cobalt-iron diffusion layer is 0.5% of a maximum value, the depth position located closest to the surface is defined as $D_{Ni\_0.5\%}$%.

4. The surface-treated steel sheet according to claim 3, wherein an Fe concentration $P_{Fe}(D_{Ni\_0.5\%})$ at the depth position $D_{Ni\_0.5\%}$ is 30% by mass or more.

5. The surface-treated steel sheet according to claim 3, wherein a Co concentration $P_{Co}(D_{Ni\_0.5\%})$ at the depth position $D_{Ni\_0.5\%}$ is 12% by mass or more.

6. The surface-treated steel sheet according to claim 1, wherein a Co content in the nickel-cobalt-iron diffusion layer is 0.2 g/m² or more.

7. The surface-treated steel sheet according to claim 1, wherein the Ni content in the nickel-cobalt-iron diffusion layer is 0.2 to 8.5 g/m².

8. The surface-treated steel sheet according to claim 7, wherein the Ni content in the nickel-cobalt-iron diffusion layer is 0.2 to 7.0 g/m².

9. The surface-treated steel sheet according to claim 1, wherein the total content of Ni and Co contained in the nickel-cobalt-iron diffusion layer is 1.6 to 10.0 g/m².

10. The surface-treated steel sheet according to claim 9, wherein the total content of Ni and Co contained in the nickel-cobalt-iron diffusion layer is 1.6 to 7.5 g/m².

11. The surface-treated steel sheet according to claim 1, further comprising an iron-nickel diffusion layer between the steel sheet and the nickel-cobalt-iron diffusion layer.

12. The surface-treated steel sheet according to claim 11, wherein a total content of Ni contained in the nickel-cobalt-iron diffusion layer and the iron-nickel diffusion layer is 1.0 to 12.5 g/m².

13. The surface-treated steel sheet according to claim 11, wherein the total content of Ni and Co contained in the nickel-cobalt-iron diffusion layer and the iron-nickel diffusion layer is 1.6 to 10.0 g/m².

14. The surface-treated steel sheet according to claim 6, wherein the Co content in the nickel-cobalt-iron diffusion layer is 1.07 g/m² or less.

15. The surface-treated steel sheet according to claim 1, wherein the steel sheet is a low carbon aluminum-killed steel, an extra-low carbon steel, or a non-aging extra-low carbon steel.

16. The surface-treated steel sheet according to claim 1, wherein a half width $W_{Co}$ of the Co concentration with respect to a maximum of the concentration of Co is 0.1 to 0.35 μm.

* * * * *